(12) United States Patent
Wirick et al.

(10) Patent No.: US 12,459,549 B2
(45) Date of Patent: Nov. 4, 2025

(54) METHOD AND CAST COMPONENTS FOR COLD FORMED CENTER SILL RAIL CAR MODIFICATION PROGRAMS AND RAILCARS FORMED THEREBY

(71) Applicant: JAC Operations, Inc., Chicago, IL (US)

(72) Inventors: Cloyd Wirick, Mineral Point, PA (US); Greg P. Josephson, Salix, PA (US); David F. Single, Portage, PA (US); Kerry Sauter, Sidman, PA (US); Robert J. Roxby, Portage, PA (US)

(73) Assignee: JAC OPERATIONS, INC., Chicago, IL (US)

( * ) Notice: Subject to any disclaimer, the term of this patent is extended or adjusted under 35 U.S.C. 154(b) by 1345 days.

(21) Appl. No.: 17/038,205

(22) Filed: Sep. 30, 2020

(65) Prior Publication Data

US 2021/0009169 A1 Jan. 14, 2021

Related U.S. Application Data

(63) Continuation of application No. PCT/US2019/025190, filed on Apr. 1, 2019.
(Continued)

(51) Int. Cl.
| | |
|---|---|
| *B61F 1/02* | (2006.01) |
| *B61D 7/00* | (2006.01) |
| *B61D 7/02* | (2006.01) |
| *B61D 17/00* | (2006.01) |
| *B61D 17/04* | (2006.01) |

(Continued)

(52) U.S. Cl.
CPC .............. *B61F 1/02* (2013.01); *B61D 7/00* (2013.01); *B61D 7/02* (2013.01); *B61D 17/00* (2013.01); *B61D 17/04* (2013.01); *B61F 1/08* (2013.01); *B61F 1/12* (2013.01); *B61D 7/28* (2013.01); *B61D 17/08* (2013.01)

(58) Field of Classification Search
CPC ...... B61F 1/02; B61F 1/12; B61F 1/08; B61F 1/14; B61D 7/02; B61D 17/08; B61D 7/00; B61D 17/00; B61D 17/04
USPC ...................... 105/416, 419, 406.1
See application file for complete search history.

(56) References Cited

U.S. PATENT DOCUMENTS

| | | |
|---|---|---|
| 2,681,470 A | 6/1954 | Johnson |
| 2,722,899 A | 11/1955 | Brown |
| (Continued) | | |

*Primary Examiner* — Zachary L Kuhfuss
(74) *Attorney, Agent, or Firm* — Blynn L. Shideler; Krisanne Shideler; BLK Law Group

(57) ABSTRACT

A method of modification of a railcar which includes providing an existing railcar with a cold formed center sill; removing an upper portion of the railcar; Cutting and splicing the center sill; Forming an upper railcar body having top chord sections and a pair of end walls and side walls coupled to the top chord structure, wherein each sidewall includes a side sheet, a plurality of side stakes and side sill; Forming an underframe construction including the spliced center sill, bolsters configured to be above truck assemblies and coupled to the center sill and a plurality of lateral I-Beam cross bearers that extend from the center sill toward and stopping short of the inside of the side sheet, and wherein the cross bearers include vertical connection plates configures for coupling to side stakes which are positioned between the bolsters; and Coupling the upper body to the underframe.

15 Claims, 29 Drawing Sheets

Related U.S. Application Data

(60) Provisional application No. 62/650,472, filed on Mar. 30, 2018.

(51) Int. Cl.
  *B61F 1/08* (2006.01)
  *B61F 1/12* (2006.01)
  *B61D 7/28* (2006.01)
  *B61D 17/08* (2006.01)

(56) References Cited

U.S. PATENT DOCUMENTS

| | | | |
|---|---|---|---|
| 2,973,102 A * | 2/1961 | Nystrom | B61G 9/125 |
| | | | 213/45 |
| 3,774,554 A * | 11/1973 | O'Neill | B61D 1/00 |
| | | | 105/416 |
| 4,212,252 A | 7/1980 | Hart et al. | |
| 4,361,097 A | 11/1982 | Jones et al. | |
| 4,911,082 A | 3/1990 | Richmond | |
| 5,181,474 A * | 1/1993 | Miller | B61D 39/00 |
| | | | 105/418 |
| 5,253,593 A | 10/1993 | Kurtz et al. | |
| 5,335,603 A | 8/1994 | Wirick et al. | |
| 5,488,912 A | 2/1996 | Pileggi et al. | |
| 5,813,353 A | 9/1998 | Sauter | |
| 5,943,964 A * | 8/1999 | Downes | B61G 9/22 |
| | | | 105/420 |
| 6,119,345 A | 9/2000 | Lydic et al. | |
| 6,148,735 A | 11/2000 | Sauter et al. | |
| 6,769,366 B1 | 8/2004 | Lydic et al. | |
| 6,978,720 B2 | 12/2005 | Johnson | |
| 7,069,864 B2 * | 7/2006 | Gray | B61F 1/02 |
| | | | 105/420 |
| 7,434,519 B2 | 10/2008 | Forbes et al. | |
| 7,461,600 B2 | 12/2008 | Forbes et al. | |
| 7,478,599 B1 | 1/2009 | Lydic et al. | |
| 7,559,284 B2 | 7/2009 | Forbes et al. | |
| 7,757,611 B2 | 7/2010 | Forbes et al. | |
| 7,878,125 B2 | 2/2011 | Forbes et al. | |
| 8,025,014 B2 | 9/2011 | Forbes et al. | |
| 8,132,515 B2 | 3/2012 | Forbes et al. | |
| 8,240,256 B2 | 8/2012 | Nutt | |
| 8,479,661 B2 * | 7/2013 | Forbes | B61D 7/00 |
| | | | 105/245 |
| 11,338,831 B2 * | 5/2022 | Jenkins | B61F 1/02 |
| 11,945,476 B2 * | 4/2024 | Jenkins | B61F 1/02 |
| 2006/0005740 A1 * | 1/2006 | Gray | B61D 17/10 |
| | | | 105/420 |
| 2010/0258031 A1 * | 10/2010 | Forbes | B61F 1/02 |
| | | | 105/355 |
| 2017/0129504 A1 | 5/2017 | Single | |
| 2021/0039685 A1 * | 2/2021 | Josephson | B61D 3/00 |
| 2023/0391379 A1 * | 12/2023 | Josephson | B61D 7/02 |
| 2023/0399031 A1 * | 12/2023 | Kress | B61F 1/02 |
| 2024/0391507 A1 * | 11/2024 | Josephson | B61F 1/14 |

\* cited by examiner

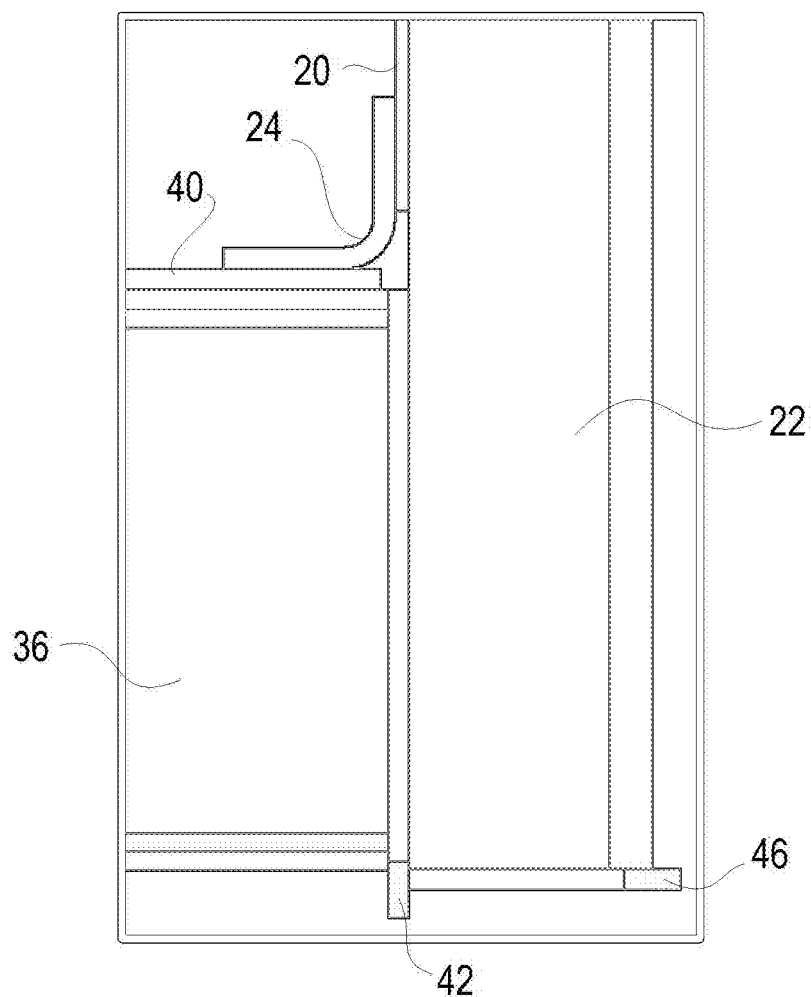
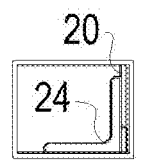
FIG. 5

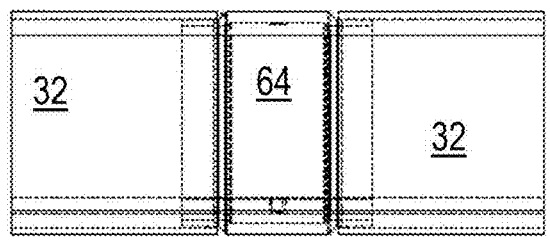
FIG. 12
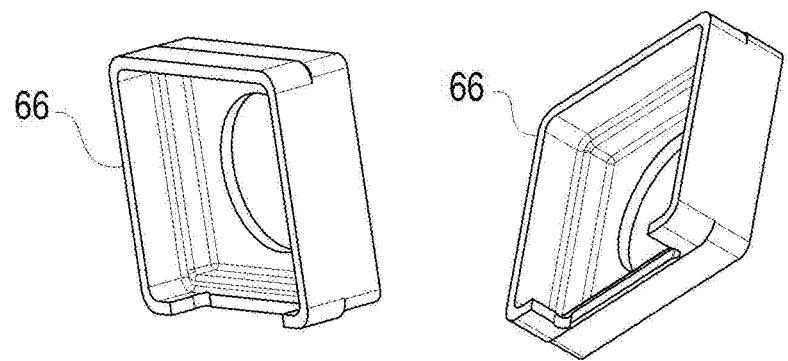
FIG. 13A
FIG. 13B
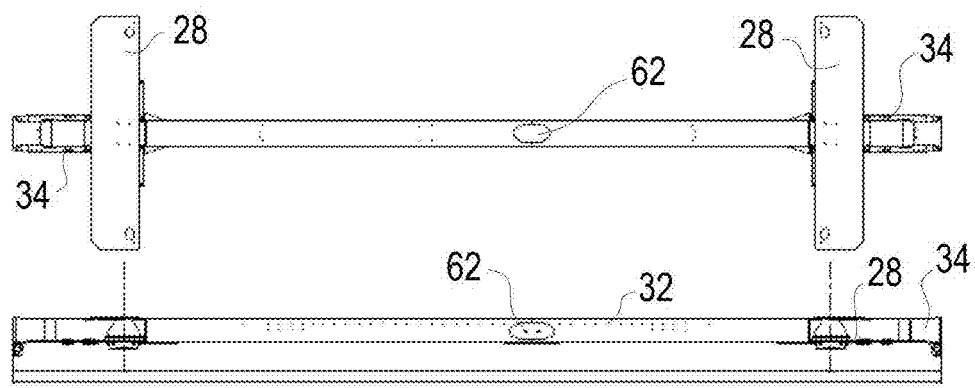
FIG. 16
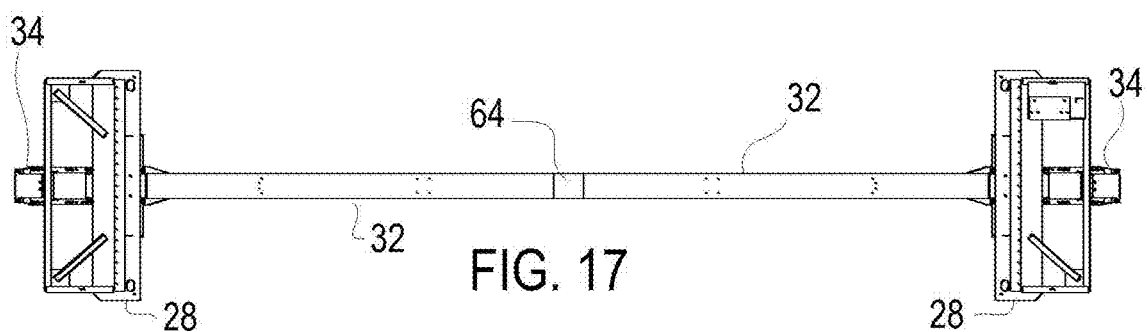
FIG. 17

METHOD AND CAST COMPONENTS FOR COLD FORMED CENTER SILL RAIL CAR MODIFICATION PROGRAMS AND RAILCARS FORMED THEREBY

RELATED APPLICATIONS

This application is a continuation of International Application Serial Number PCT/US2019/025190 filed Apr. 1, 2019 and published Oct. 3, 2019 as WO 2019/191762, which publication and application are incorporated herein by reference.

International Application Serial Number PCT/US2019/025190 claims the benefit of U.S. Provisional Patent Application Ser. No. 62/650,472 titled "Method and Cast Components for Cold Formed Center Sill Rail Car Modification Programs and Railcars Formed Thereby."

BACKGROUND OF THE INVENTION

1. Field of the Invention

The present invention relates to railroad car modifications, and more particularly to a method and associated cast components for cold formed center sill railcar modification programs and the railcars formed thereby.

2. Background Information

In the railroad art, rolling stock has become very specialized with cars specific for transporting automobiles (vehicle carriers), shipping containers (well cars), bulk commodities open top gondola for hauling coal, ballast, coke, wood chips, ore, sand, scrap metal and construction debris, and aggregate, bulk commodities closed top hoppers for hauling grain, sand, cement, potash, soda ash, DDG, and roofing granules, bulk commodities open top hoppers for products similar to open top gondola, tanker cars and more. Railcars typically have a very long useful life of 50+ years of potential service. However due to changes in the marketplace there can be a large surplus of a given car type. Additionally the efficiency of newer car types might make a prior car type obsolete before the end of the useful life of the railcar.

For example currently in the United States there is currently a surplus of railcars originally built primarily for hauling coal, due both to the interrelated increases in the use of natural gas in power generation and an open-secret "war on coal" in the Obama Administration (including but not limited to restrictive use of Clean Water Act's 404(c) permit for new and existing mining operations; denial of export terminals requisite permits restricting coal exports; a torrent of stringent new regulations of greenhouse gasses (including CO2) under the Clean Air Act; EPA effective banning of the construction of new coal-fired power plants by requiring them to implement prohibitively expensive carbon capture and storage technology.)

It has been known to repurpose or modification of an older surplus or obsolete car type into a car type that has greater current utility. "Modification" is Association of American Railroads (AAR) defined term (see Office Manual of the AAR Interchange Rules, rule 88(d)(2)) defined as a change to a car that alters capacity of car, or size of car type, or type of lading being hauled. This application uses the terms modification and modify in connection with this rule whereby within this application rail car modification programs reference programs that will modify railcars within the meaning of this AAR rule.

There is a need for effective and efficient modification methodologies for coal cars in particular and the present invention is primarily related to cold formed center sill railcar modification programs and associated cast components for cold formed center sill railcar modification programs and the railcars formed thereby.

SUMMARY OF THE INVENTION

It is an object of the present invention to provide an effective and efficient modification method and associated cast components for cold formed center sill railcar modifications and the railcars formed thereby.

One aspect of the invention provides a method of modification of a railcar which includes providing an existing railcar with a cold formed center sill; removing an upper portion of the railcar; Cutting and splicing the center sill; Forming an upper railcar body having top chord sections and a pair of end walls and side walls coupled to the top chord structure, wherein each sidewall includes a side sheet, a plurality of side stakes and side sill; Forming an underframe construction including the spliced center sill, bolsters configured to be above truck assemblies and coupled to the center sill and a plurality of lateral I-Beam cross bearers that extend from the center sill toward and stopping short of the inside of the side sheet, and wherein the cross bearers include vertical connection plates configures for coupling to side stakes which are positioned between the bolsters; and Coupling the upper body to the underframe.

These and other advantages of the present invention will be clarified in the brief description of the preferred embodiment taken together with the drawings in which like reference numerals represent like elements throughout.

BRIEF DESCRIPTION OF THE DRAWINGS

FIG. 4 is an enlarged sectional end view of the cross bearer and side stake coupling of the modified gondola railcar according to FIG. 1.

FIG. 5 is an enlarged sectional end view of an alternative side sill of the modified gondola railcar according to FIG. 1.

FIGS. 11 and 12 are perspective and side views of a center sill coupling with a splice casting for a modification according to the present invention.

FIGS. 13a and b are perspective views of a cast transition member for a fabricated draft arm assembly to cold formed center sill.

FIG. 16 are top and side views of an alternative burned downed or hulked center sill and draft arm components of the railcar of FIG. 9 that have been spliced for a modification railcar according to the method of the present invention;

FIG. 17 is a top view of an alternative burned downed or hulked center sill and draft arm components of the railcar of FIG. 9 that has been spliced for a modification railcar according to the method of the present invention;

DESCRIPTION OF THE PREFERRED EMBODIMENTS

Figure 1:
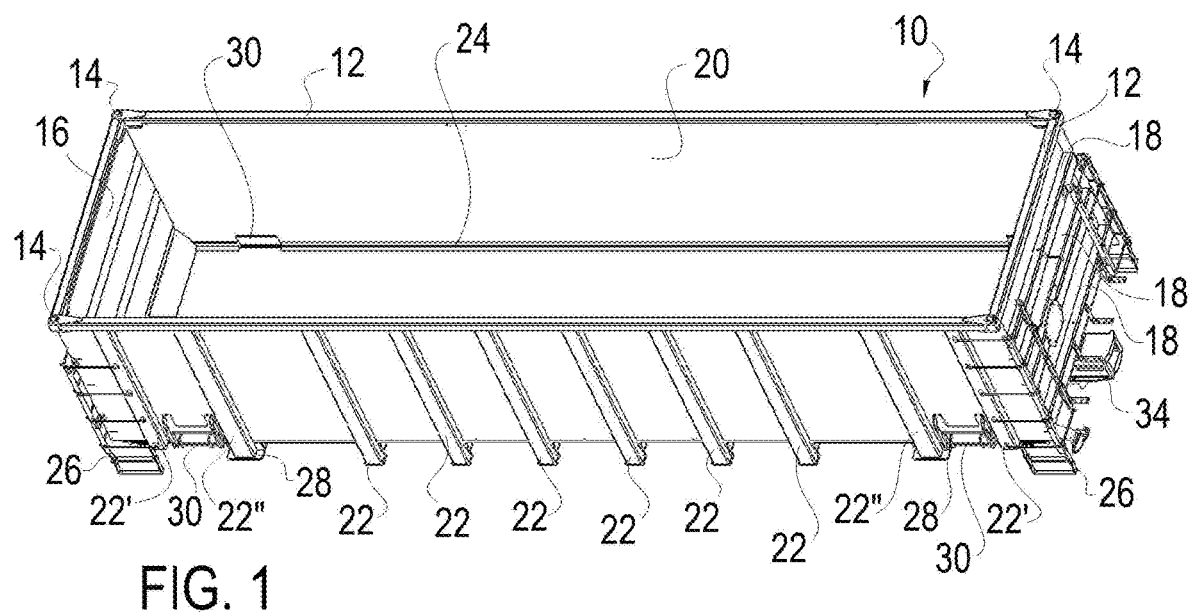
FIG. 1 is a perspective view of a modification or modified gondola railcar according to the one embodiment of the present invention.

The present invention provides method and associated cast components for cold formed center sill railcar modification programs and the railcars formed thereby.

As background the trucks, center sill 32, draft arm assemblies 35, couplers, collectively represent considerable cost components of a railcar 10 and the reuse of some or all of these components makes railcar modification feasible, provided there is not too much work associated with conforming the prior existing bolsters and center sill 32 orientations to the end design (the trucks will generally be the same in a rebuilt car 10).

The center sill 32 is the primary structural member of the underframe of a rail car. It is subjected to the buff and draft forces created during operation of the railcar 10 and normally extends as a continuous member along the length of the car body. In the past, center sills have possessed many different cross-sectional configurations depending on the type of rail car and other considerations and it was well known to form a center sill by welding a plurality of pieces together as a unit along its substantial length.

The use of welds in earlier center sill designs to manufacture center sills presented several problems including that i) because welding is needed, the reliance on this process to fabricate a finished center sill is inefficient from both a cost and productivity standpoint, ii) the application of the welds along the lengths of the pieces being joined as a center sill is labor intensive and cannot attain high-speed production, iii) the application of multiple welds heats the material being joined and results in so-called weld flux which is known to create deviations in the straightness or acceptable tolerances of the center sill being formed; iv) a welded center sill is an inherently heavy structure due to its design and fabrication technique. Addressing these drawbacks is a cold formed center sill 32 which is described in detail in U.S. Pat. Nos. 7,478,599; 6,769,366 and 6,119,345, which are incorporated herein by reference. A cold formed center sill 32 of this type provides an improved, light weight center sill in which the necessity of welds or other securement techniques are eliminated. In a modification of a railcar to a new car type, as in the present invention, it is common and generally required to adjust the length of the center sill 32 to the new car length configuration as a critical step. It is theoretically possible to replace a center sill in a rebuild program with a completely new center sill, but such a process becomes less a rebuild and more of scrapping an old car for parts. The modification program according to the present invention require the use of the existing center sill 32, namely a cold formed center sill 32. The center sill 32 may be cut down/shortened or extended/lengthened depending on the modification. A modification of a car having a welded fabricated center sill can quickly become impractical in the lengthening and/or shortening of the center sill in part due to the wider tolerances in camber, sweep and twist of the welded center sill. The tighter tolerances inherent in the cold formed center sills 32 make these particularly well suited for modifications applications in accordance with the method of the present invention.

Figure 38A:
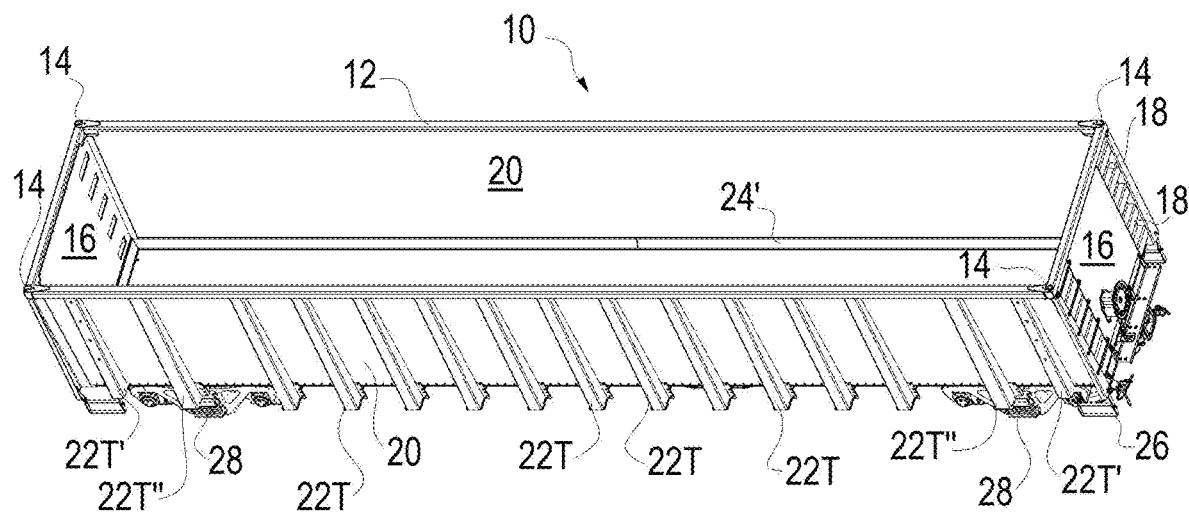
FIG. 38A is a perspective view of a further modified version of the gondola railcar according to the embodiment of FIG. 1 using the underframe of FIG. 2.

Prior to describing a method of modification, the resulting design of one rebuilt railcar type is helpful to understand. FIGS. 1-8 illustrate an open top gondola modified or modification railcar 10 with railcar underframe and sidewall construction that simplifies construction, minimizes car weight while yielding the necessary structural support without sacrificing cargo carrying capacity. FIGS. 38A and B illustrate an alternative embodiment of the railcar disclosed in FIGS. 1-8 and using the underframe shown in FIG. 2.

Each modification railcar 10 includes a number of conventional features that need not be described herein in detail as they are generally well known in the art and generally only the underframe and sidewall construction are described in detail herein. Examples of gondola cars are illustrated in U.S. Pat. Nos. 4,212,252; 4,361,097; 4,911,082; 5,253,593; 5,335,603; 5,488,912; 5,813,353; 6,148,735; 6,978,720; 8,132,515; 8,240,256, which patents are incorporated herein by reference establishing the general nature of the relevant art relating to gondola type cars.

Each railcar 10 includes top chord sections 12 above the sidewalls and end-walls. Extruded closed sections can effectively form the top chord sections 12 although other top chord configurations are possible. The railcar 10 includes a pin coupling 14 between the end wall top chord 12 and the side wall top chord 12 as shown.

The end-walls are generally formed of end sheet 16 and cross supports 18. The end sheet 16 can be formed a plurality of coupled sheet materials extending from the top chord 12 to the floor structure, however one piece structure forming the end sheet 16 is preferred. The cross supports may be extruded channel sections, I-beam, t-sections or a variety of supporting beam shapes.

The sidewalls are generally formed of side sheet 20, side stakes 22 and side sill 24. The side sheet 20 can be formed a plurality of coupled sheet materials extending from the top chord 12 to the side sill 24, however a single sheet forming the side sheet 20 is preferred. The side stakes 22 are coupled to the top chord 12 and the side sheet 20 and are preferably mainly formed as extruded channels and will be described further below.

The side sill 24 may be a closed section like the top chord 12, or other conventional shape such as a solid bar, but a pressed angle or structural angle as shown best in FIGS. 4 and 5 is preferred as it represents a cost effective design that does not take away from the cargo carrying capacity of the railcar 10.

Two more conventional side stakes (22' and 22") differ from the side stake 24 construction between the bolsters that, as described below, form an important part of the design of the modified railcar 10 of the present invention. The first more conventional side stake is a ladder side stake 22' at the ends of each sidewall and in addition to a side stake it forms an attaching point for a corner ladder 26. The ladder side stake 22' is not associated with a cross bearer and mainly functions as a side wall support and as one attachment for the corner ladder 26. The second specialized side stake is the bolster side stake 22" that extends from the top chord 12 to a laterally extending part of a bolster 28. The bolster side stake 22" sees more structural loading and is generally thicker and/or dimensioned larger (e.g. a wider channel) to accommodate the extra loading. The bolster side stake 22" may also be internally reinforced as with side stakes 22 discussed below, however as shown the bolster 28 includes a horizontal coupling portion and a vertical bolster to side connection plate making further reinforcement of the bolster side stake 22" less needed.

The modified gondola car 10 also includes multiple clean-out doors 30, also called access doors, built into the side wall and floor structure for removing small amounts of residual material from the car and/or to wash out the railcar interior. The clean out/wash out doors 30 can be particularly important if the car 10 is changing from hauling one type of lading to another. Car maintenance is another reason for requiring a thorough removal of residual lading. Typically the cleanout doors 30 are simply hatches or doors that close against the floor of the gondola railcar, examples of which can be seen in U.S. Pat. Nos. 2,681,470; 2,722,899; 7,434,519; 7,461,600; 7,559,284; 7,757,611; 7,878,125, and 8,025,014 which patents are also incorporated herein by reference, and the door 30 may be formed in these conventional fashions, however the sidewall and floor mounting disclosed in U.S. Patent Publication No 2017/0129504 is preferred and this disclosure is incorporated herein by reference.

Figure 8:
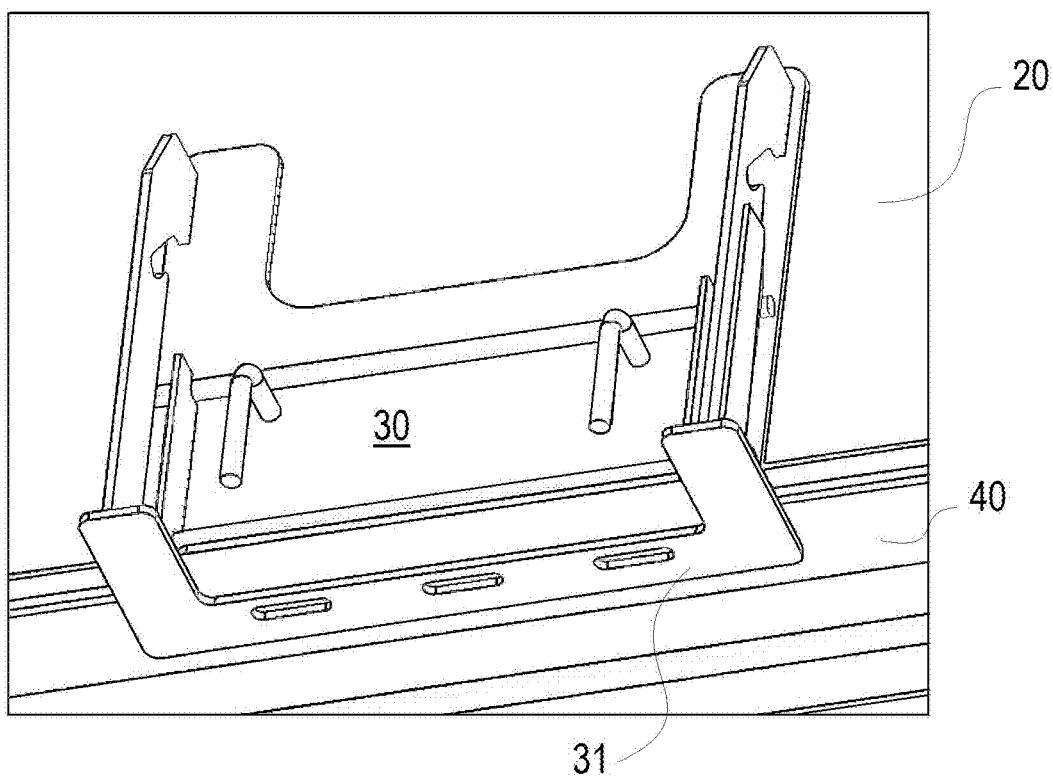
FIG. 8 is a perspective view of a cleanout door design of the modified gondola car 10 of according to FIG. 1.

The preferred cleanout door 30 is formed as generally described in U.S. Patent Publication No. 2017/0129504 except with the inclusion of a u-shaped closure plate 31 shown in FIG. 8. The closure plate 31 is added because of the material savings associated with a shorter floor 40 in the railcar 30 than in the design shown in in U.S. Patent Publication No 2017/0129504. This door 30 design actually forms a larger opening than in the in U.S. Patent Publication No 2017/0129504. Additionally the slot holding the door in the open position is deeper than shown in U.S. Patent Publication No 2017/0129504 making it more secure and safer preventing unwanted accidental dislodgement during use that could injure a worker. Preferably the top of the bar should be contained entirely within the slot in the stowed position.

Figure 2:
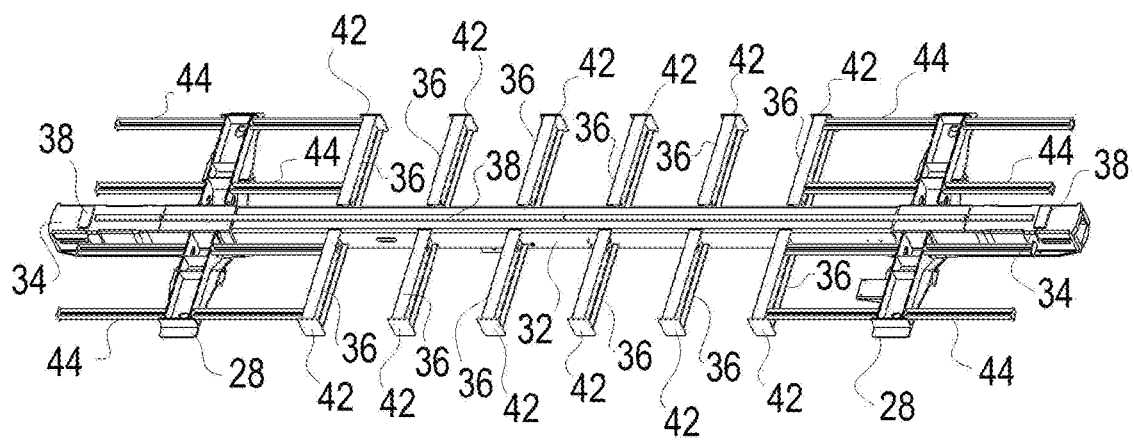
FIG. 2 is a perspective view of the underframe construction of the modified gondola railcar according to FIG. 1.

FIG. 2 is a perspective view of the underframe construction of the gondola railcar 10 according to the present invention. The underframe uses a cold formed center sill 32 running the length of the car with draft sills (also known as end sections or draft arms) 34 at each end. Regarding the draft arms 34, cast arms and fabricated arms are known and either may be used in the railcar 10 although fabricated arms may further require transition pieces between the draft arm and the center sill 32. Further the draft arms 34 receive the desired coupler assemblies appropriate for the car 10.

Figure 3:
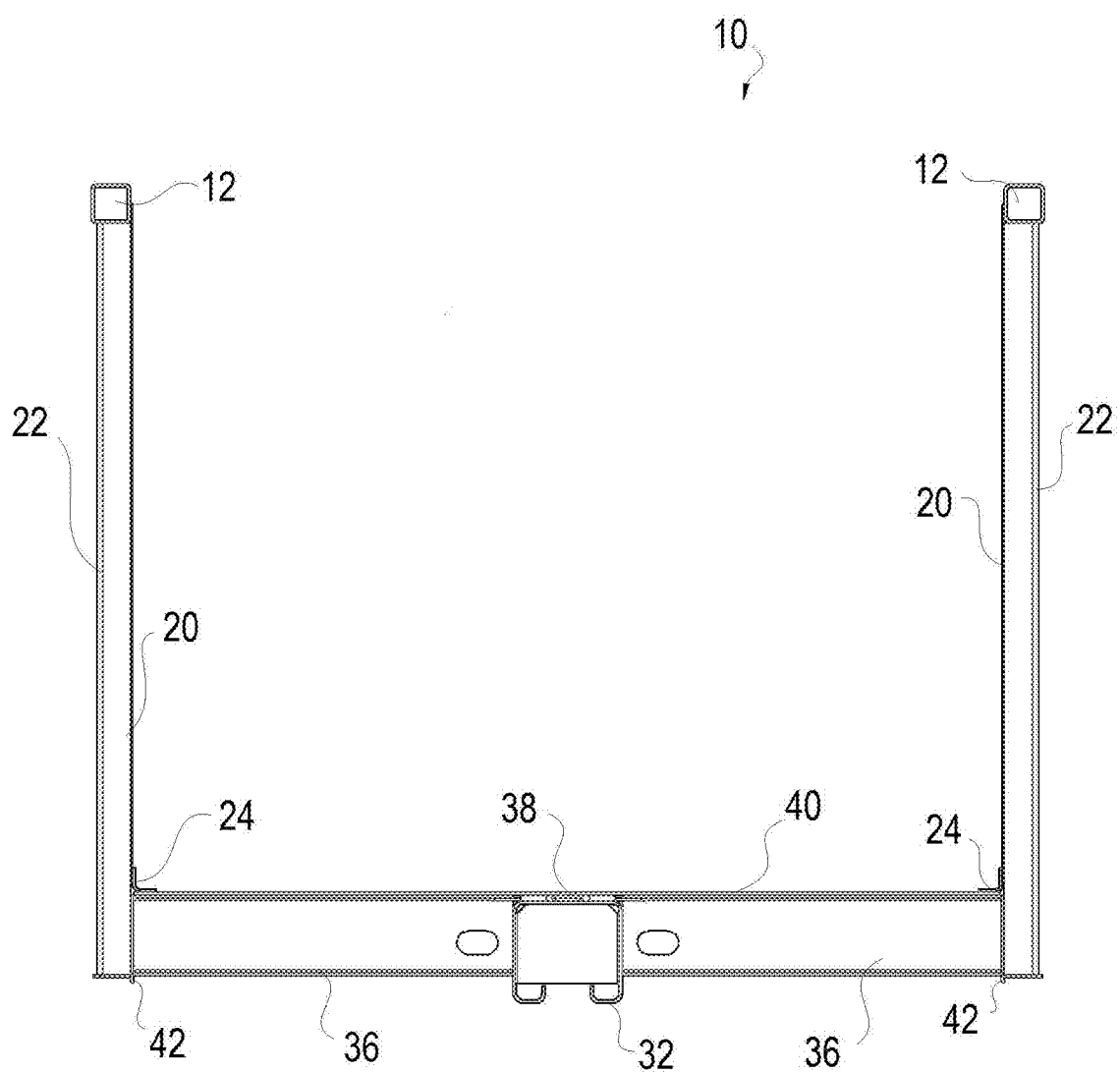
FIG. 3 is a sectional end view taken through a cross bearer of the modified gondola railcar according to FIG. 1.

The bolsters 28 are above the trucks (not shown) and coupled to the center sill 28. Between the bolsters 28, the underframe of the railcar 10 includes a plurality of lateral I-Beam cross bearers 36 that extend from the cold formed center sill 32 extending toward but stopping short of the inside of the side sheet 20, as best shown in FIG. 4. The top of the I-Beam cross bearers 36, the flanges, align with and support the floor sheets 40 of the railcar 10. Spacers 38 may be included on the center sill 32 and the draft arm assemblies 34 to align with and couple to the floor sheets 40. The cross bearers 36 include vertical connection plates 42 that allow for coupling to the side stakes 22 as best shown in FIGS. 3 and 4. The underframe includes longitudinal stringers 44 extending from the end cross bearers 36 to the bolster 28 and from the bolster 28 to the end wall structure. The stringers 44 may be formed as channels, S-beam, or possibly t-sections or the like.

FIG. 3 is a sectional end view taken through a cross bearer 36 of the gondola railcar 10 and FIG. 4 is an enlarged sectional end view of the cross bearer 36 and side stake 22 coupling of the gondola railcar 10 according to invention. As described above the I-Beam cross bearers 36 extend from the center sill 32 extending toward but stopping short of the inside of the side sheet 20. The floor sheets 40 also can stop short of the inside of the side sheet 20 as it need only extend to the coupling of the side sill 24, which is preferably either a pressed or structural angle as shown, alternatively, in FIGS. 4 and 5. The side stakes 22 extend from the top chord 12 and are coupled to a cross bearer 36 through a vertical connection plate 42. A side stake cap 46 may be added to the side stakes 22, with weep holes therein to allow the egress of moisture. The side stakes 22 are preferably reinforced as shown in FIGS. 6 and 7.

Figure 6:
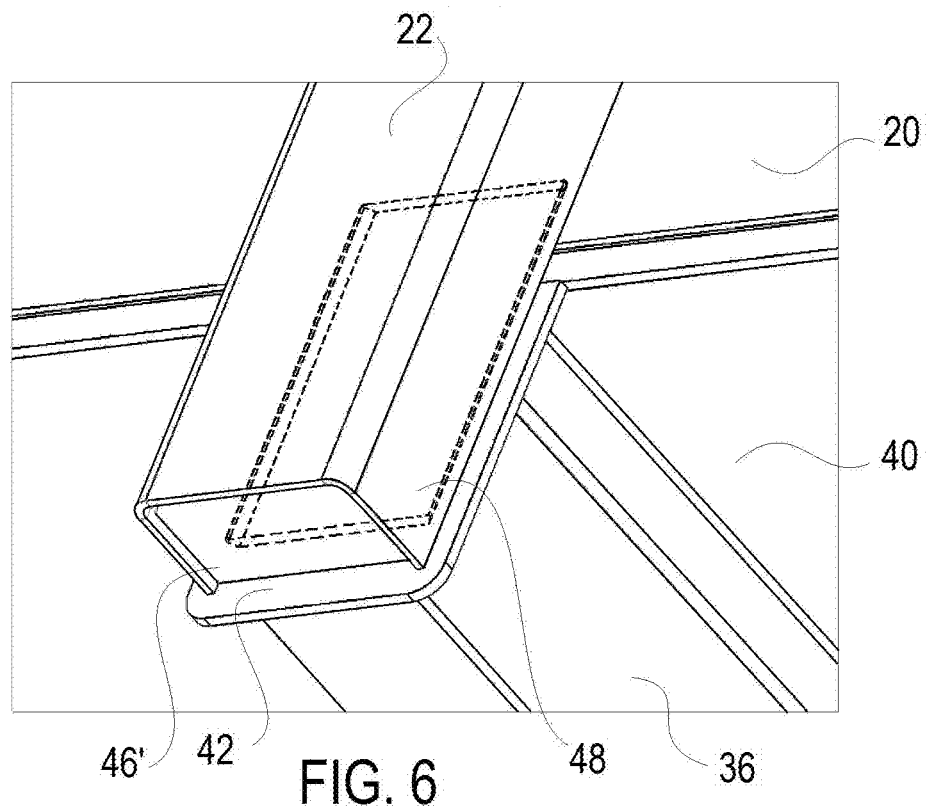
FIGS. 6 and 7 are enlarged perspective views of the reinforced side stake construction of the modified gondola railcar according to FIG. 1.
Figure 7:
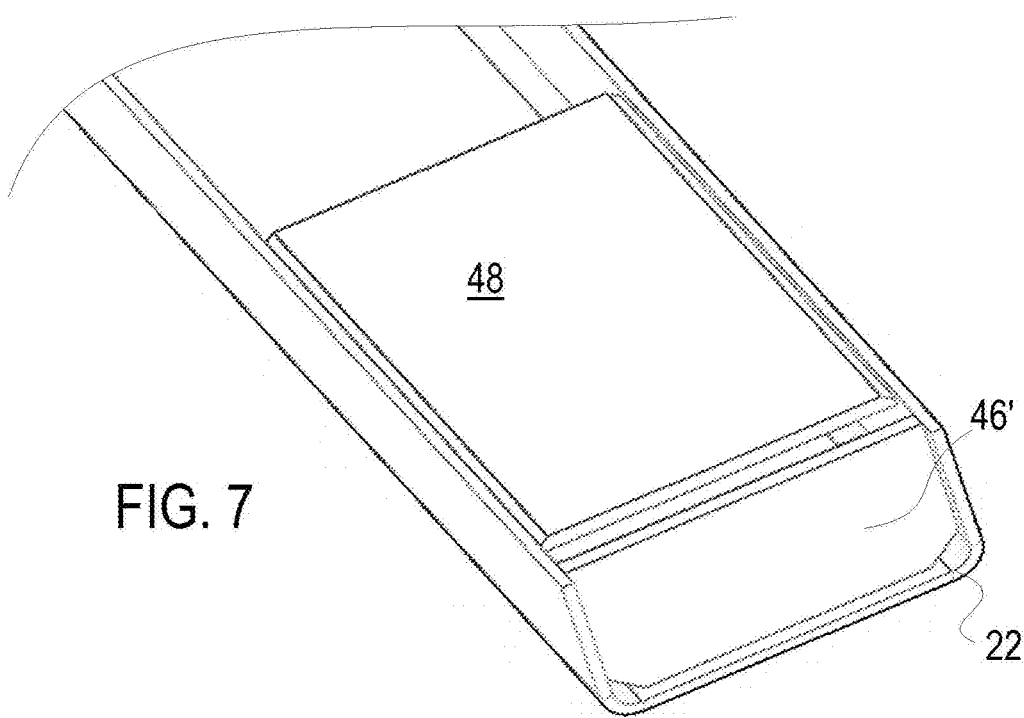

FIGS. 6 and 7 are enlarged perspective views of the reinforced side stake 22 construction of the gondola railcar 10. It is preferred if each side stake 22 includes a stub reinforcing plate 48 within the side stake 22 extending between the legs thereof and extending across the area of the side sill 24. The plate 48 is referenced as a stub plate as it does not extend the entire length of the side stake 24 but reinforces the area of the stake 22 around the side sill 24 through the bottom of the side stake 22. FIGS. 6 and 7 show a modified cap 46' that is fitted into the interior of the side stake 22 and the weep holes can easily be formed as beveled or cut off corners of the plate forming openings (weep holes) in the corners. The internal cap 46' offers some material savings over the cap 46 and the use of this type is most dependent upon the assembly time, namely the internal cap 46" is preferred if it does not add significant assembly time to the overall construction.

The present invention may be described as forming a modified open top gondola car 10 that includes top chord sections 12; a pair of end walls and side walls coupled to the top chord structure 12, wherein each sidewall includes a side sheet 20, a plurality of side stakes 22, 22' and 22" and side sill 24; and an underframe construction including a center sill 32 running the length of the car, bolsters 28 configured to be above truck assemblies and coupled to the center sill 32 and a plurality of lateral I-Beam cross bearers 36 that extend from the center sill 32 toward and stopping short of the inside of the side sheet 20, and wherein the cross bearers 36 include vertical connection plates 40 configures for coupling to side stakes 22 which are positioned between the bolsters 28. Every side stake 22, 22' and 22" is welded to the top chord 12 and welded to the side sheet 16 and extending the full height of the side sheet 20. Side stake 22 and 22" extend past the floor to cross supporting structures of the underframe (bolster 28 and cross bearers 36).

Figure 38B:
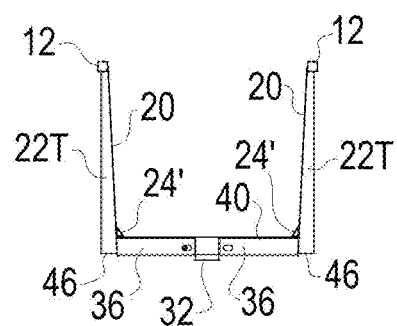
FIG. 38B is a sectional end view of the gondola railcar of FIG. 38A.

FIGS. 38A and 38B illustrate an alternative embodiment of the railcar of FIG. 1 in which the railcar 10 includes top chord sections 12 above the sidewalls and end-walls. The end-walls are also formed of internal and external end sheets 16 and intervening cross supports 18. As discussed above, the end sheets 16 can be formed a plurality of coupled sheet materials extending from the top chord 12 to the floor structure, however one piece structure forming each end sheet 16 is preferred. The cross supports 18 may be extruded channel sections, I-beam, t-sections or a variety of supporting beam shapes. However an open channel with corresponding aligned openings in the internal end sheet 16 as shown can form an internal ladder.

Figure 10:
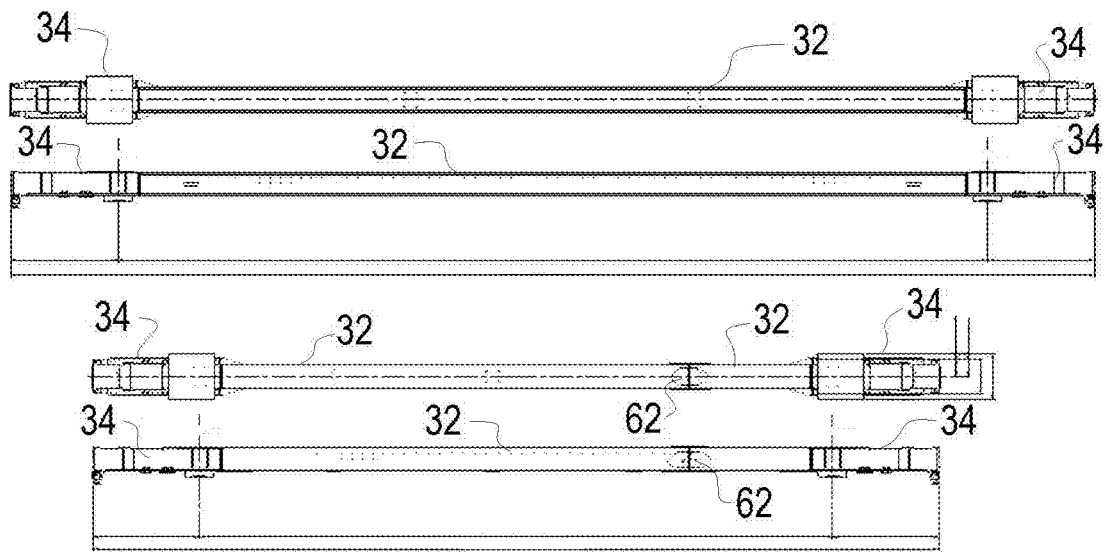
FIG. 10 shows top and side views of a burned downed or hulked center sill and draft arm components of the railcar of FIG. 9 and top and side views of the shortened, spliced, center sill and draft arm component for a modification according to the present invention.

The sidewalls are generally formed of side sheet 20, side stakes 22T and side sill 24'. The side sheet 20 can be formed a plurality of coupled sheet materials extending from the top chord 12 to the side sill 24', however a single sheet forming the side sheet 20 is preferred as described above. The side stakes 22T are coupled to the top chord 12 and the side sheet 20 and are preferably mainly formed as extruded channels and will be described further below. The side sill 24' may be a closed section like the top chord 12 as shown (here a triangular closed section), or other conventional shape such as a solid bar, or a pressed angle or structural angle as shown best in FIGS. 4 and 5. Further a key feature of the embodiment of FIGS. 38A and 38B is the outward taper of the inner face of the side stakes 22T as best shown in FIG. 10.

The ladder side stake 22T' at the ends of each sidewall forms an attaching point for a corner ladder 26 as discussed above, although in this car design the upper ladder is moved to the end wall as shown. The ladder side stake 22T' is not associated with a cross bearer and mainly functions as a side wall support. The second specialized side stake is the bolster side stake 22T" that extends from the top chord 12 to a laterally extending part of a bolster 28 as described above.

The railcar of FIGS. 38A and 38B utilizes the underframe construction of the gondola railcar 10 according to the present invention shown in FIG. 2 discussed above and as shown in part in FIG. 38B. FIG. 38B is a sectional end view taken through a cross bearer 36 of the gondola railcar 10 of FIG. 38A showing the taper to the side stakes 22T. As described above the I-Beam cross bearers 36 extend from the center sill 32 extending toward but stopping short of the inside of the side sheet 20. The floor sheets 40 also can stop short of the inside of the side sheet 20 as it need only extend to the coupling of the side sill 24. The side stakes 22T extend from the top chord 12 and are coupled to a cross bearer 36. A side stake cap 46 may be added to the side stakes 22T, with weep holes therein to allow the egress of moisture. The side stakes 22T are preferably reinforced as shown and described above in FIGS. 6 and 7.

Figure 9:
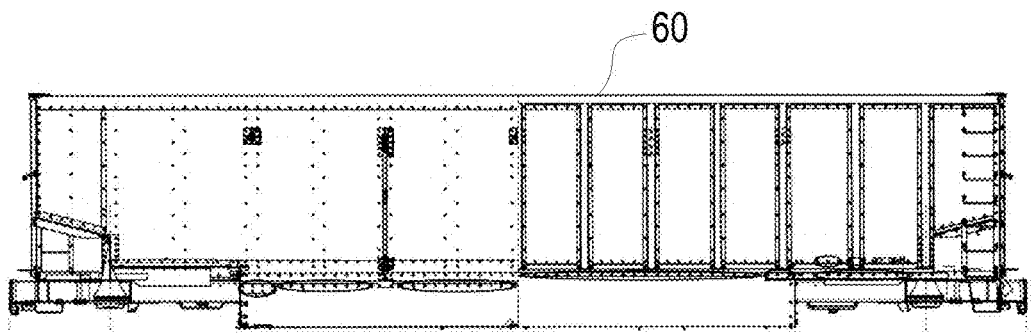
FIG. 9 is a side view of an existing cold formed center sill railcar suitable for modification according to the present invention.

With two modification end product railcars 10 described above in FIGS. 1-8 and 38A-38B the details of the modification program can be discussed. FIG. 9 illustrates an existing railcar 60 with a cold formed center sill 32 known as the BETHGON II™ developed by the assignees of this application. Technically this car 60 may be described or defined as an aluminum outside stake body, double tub floor railcar with cold formed center sill designed primarily for carrying coal. Leasing agencies have this type of car 60 in surplus and efficient repurposing could be particularly useful.

The first step of the modification of car 60 according to the present invention is known herein as burn down in which the upper portion of the car is removed. The salvaged car components of car 60 are those components that will be reinstalled on the modification railcar 10 in addition to the trucks and center sill and draft assemblies (draft arm and coupler assemblies—if appropriate), such as the control valve, brake cylinder, hand brake, and reservoir. Mainly the brake system component, the draft system components and the truck system components. Other non-reused components of the railcar 60 may be otherwise repurposed or scrapped for salvage.

FIG. 10 illustrates top and side views of a burned downed or hulked center sill 32 and draft arm assembly 34 components of the railcar 60 of FIG. 9 and top and side views of the shortened, spliced, center sill 32 and draft arm or draft sill components 34 for a modification railcar 10 according to the present invention. The spliced center sill 32 included splicing patches 62 on a top and side surface of the center sill 32 and a reinforcement plate on the bottom of the center sill 32 at the splice location in accordance with AAR requirements (see rule 57 of the AAR field manual).

Figure 11:
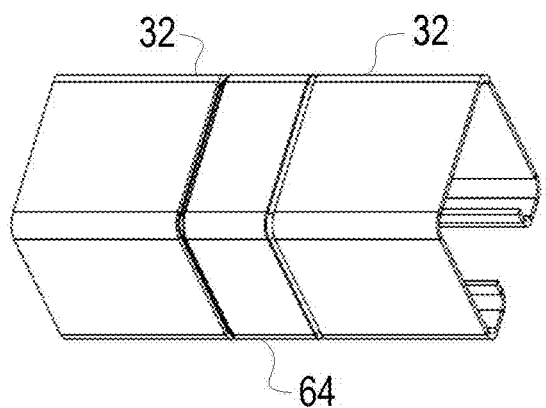

FIGS. 11 and 12 are perspective and side views of a center sill 32 coupling with a splice casting 64 for a modification according to the present invention. The present method may preferably implement the splicing casting 64 in place of the patches 62 to facilitate the attaching of the shortened center sill 32. The splice casting 64 has a center portion of 6-7" and the same profile as the exterior of the rolled formed center sill, with two end sections that telescope into the interior of the spliced center sill 32 sections as shown. The center portion of the splice casting 64 can theoretically be used to add length to the center sill 32, but it would be used to add lengths of a limited amount (2 feet or less). Typically, the splice casting 64 is only used for connection as the center section is only 6-7" in length and the total weight is preferably less than 100 LBS, and preferably less than 80 LBS. The size of the casting 64 is determined by the particular cold formed center sill 32 shape in the existing car 60.

The existing center sill 32, once sized to the desired length is inspected and must be free of damage and inspected for heat damage, cracks, nicks and gouges, and other damage including to damage to the splice patches 62 (if used), splice casting 64 (if used). The center bowl should also be inspected before proceeding. Further all areas in which the components of the railcar 60 were removed or cut away needs to be inspected. The modified center sill 32 must be straight to within 0.500" in 6'.

Once the unit is cut down the spliced center sill 32 is formed into the underframe of FIG. 2 and coupled to an upper railcar body portion to form the railcar 10 of FIG. 1. The spacers 38 would simply skip the area of the splice patches 62 if used. The existing trucks from the car 60 will be used as well in the modification gondola car 10. Portions of the original bolster 28 can be used to the extent they can conform to the final bolster 28 of FIG. 2. Any removed components that are reusable are attached to the railcar 10 generally around when the trucks are reinstalled on the railcar 10.

Figure 14:
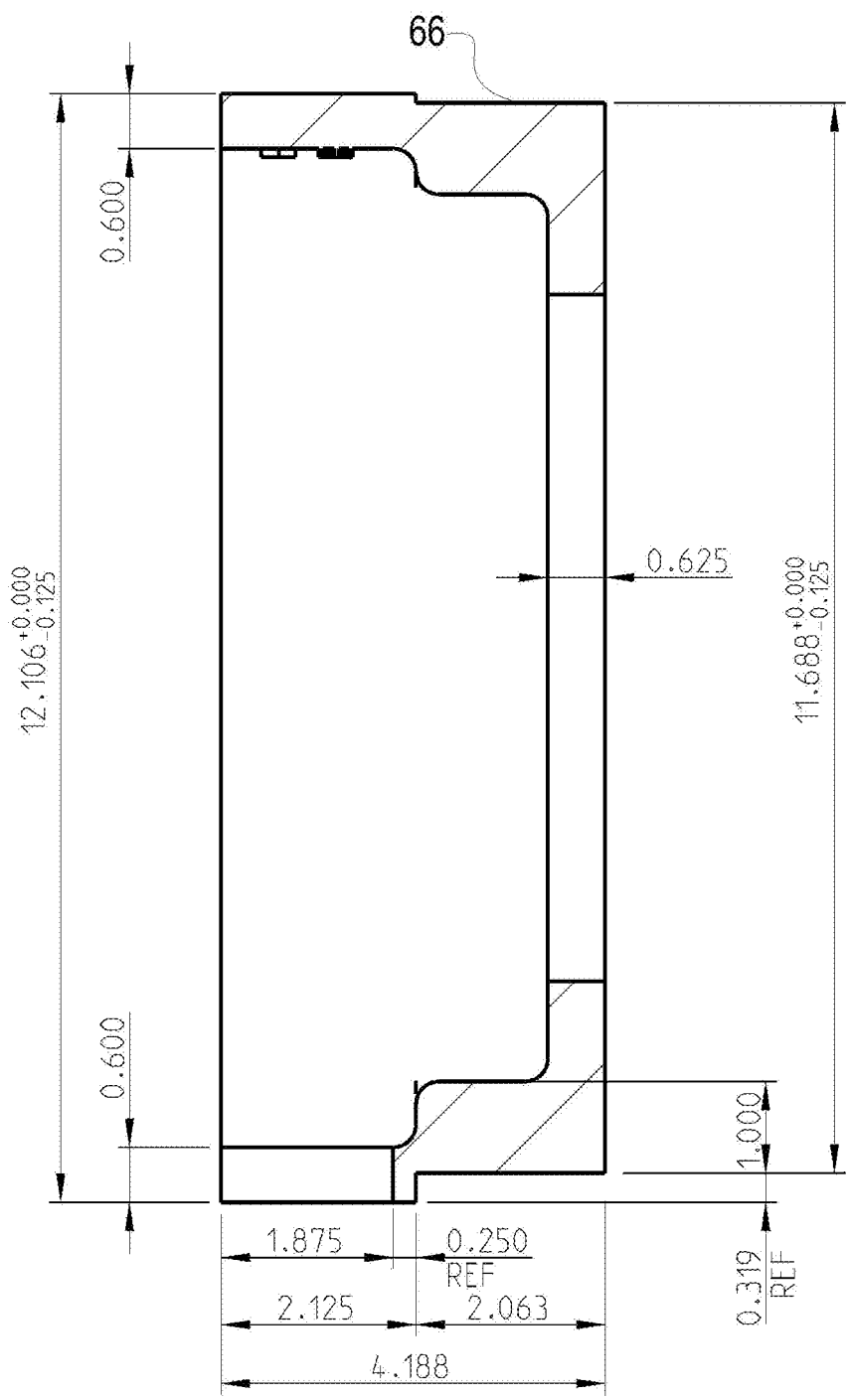
FIG. 14 is a sectional view of the cast transition member of FIG. 13.

FIGS. 13 A and B are perspective views of a cast transition casting 66 for a fabricated draft arm 34 to cold formed center sill 32. FIG. 14 is a sectional view of the cast transition casting 66 of FIG. 13. The cast transition casting 66 is a lightweight design and is generally under 75 LBS and preferably under 55 LBS and allows for easy transition from fabricated end assemblies 34 (draft arm or draft sill) to the center sill 32. The casting 66 allows for replacement of either draft arm 34 in the modification and can be used effectively in place of a splice casting 64 in cutting down a center sill 32 from the railcar 60.

Figure 15:
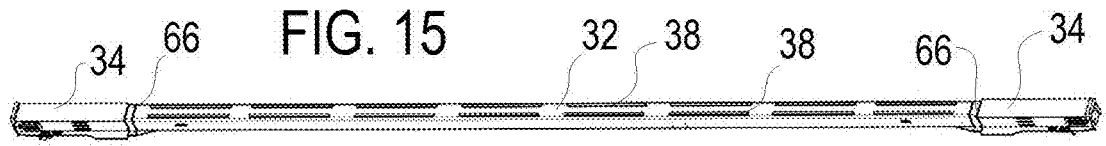
FIG. 15 is a perspective view of a center sill and draft arm assembly using a cast transition castings for building a new or modified railcar according to the present invention.

FIG. 15 is a perspective view of a center sill 32 and draft arm assembly using two of slightly different cast transition castings 66 for building a new railcar 10 or building a modification according to the present invention. In building a railcar as an entirely new car with castings 66, rather than a modification of a prior car 60, the castings 66 can facilitate the assembly of the car 10 and gives the designers an option for the draft arm assemblies 34.

In a modification configuration where both (or at least one) of the original draft arms 34 are maintained, a single casting 66 can still be used to couple (or splice) one draft arm 34 to the shortened center sill 32. In this mode the original center sill 32 is cut at the connection with one draft arm 34, the portion to be removed cut from the center sill 32 and the shortened center sill 32 is coupled to the coupler 64 through the use of the casting 66.

The modification methodology of the present invention is not limited to forming the one railcar 10 shown in FIGS. 1-8, although that design has particular advantages in the marketplace. FIG. 16 is a top and side view burned downed or hulked center sill 32 and draft arm 34 components from the railcar 60 of FIG. 9 which have been shortened, spliced (with patches 62) for a modification railcar known as a VERSAFLOOD™ Hybrid railcar discussed below in connection with FIG. 19A. The castings 64 or 66 may be used in this modification as well. The VERSAFLOOD™ Hybrid railcar may be described as an outside stake, three hopper railcar with steel hoppers and outside stake aluminum upper sheets having a cold formed center sill.

Additionally with the castings 64 and 66 it is possible to lengthen the center sill 32 with intervening added sections and using the castings 66 and possibly 64.

The existing BETHGON II™ style car 60 may be described as an open top, all steel underframe with through center sill (preferably a cold formed center sill 32), aluminum outside stake, one piece aluminum side, flat intermediate floor, two interior K braces with three additional top ties (separate from the K braces), twin aluminum rounded bottom tubs railcar 60 designed primarily for carrying coal can be effectively modified. This definition defines a type of car suitable for modification under the present invention, even if some of the defined structural elements of this definition are ultimately scrapped in the process.

Figure 18A:
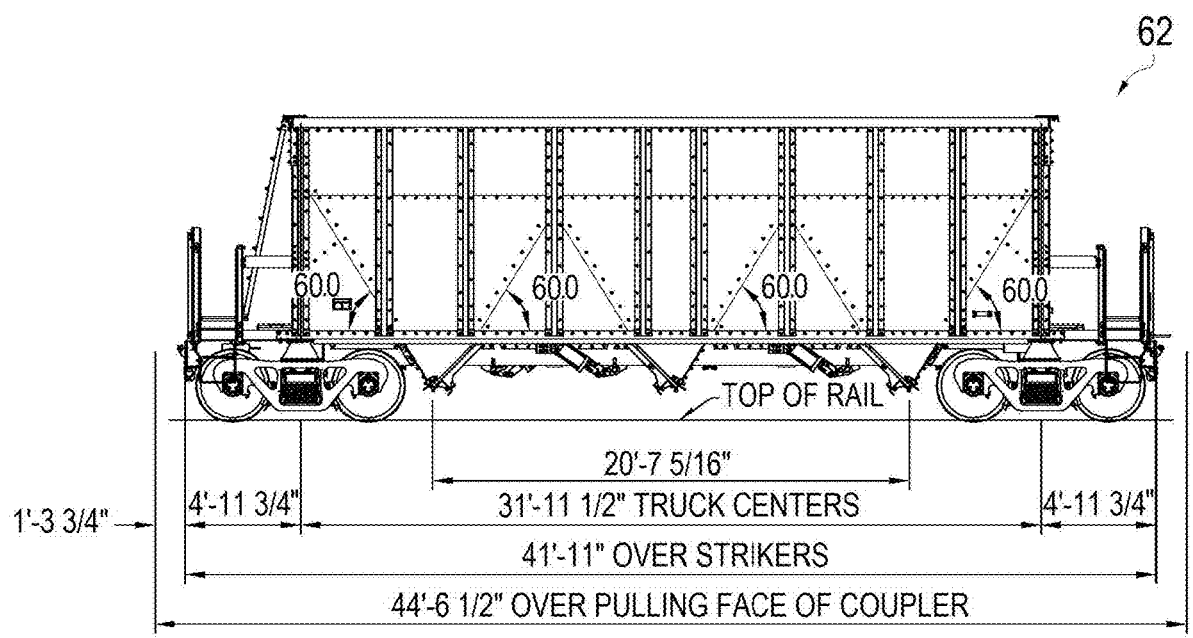
FIG. 18A is a side elevational view of an open top hopper, aggregate hopper, transverse door, steel or stainless steel modification railcar according to the method of the present invention.
Figure 18B:
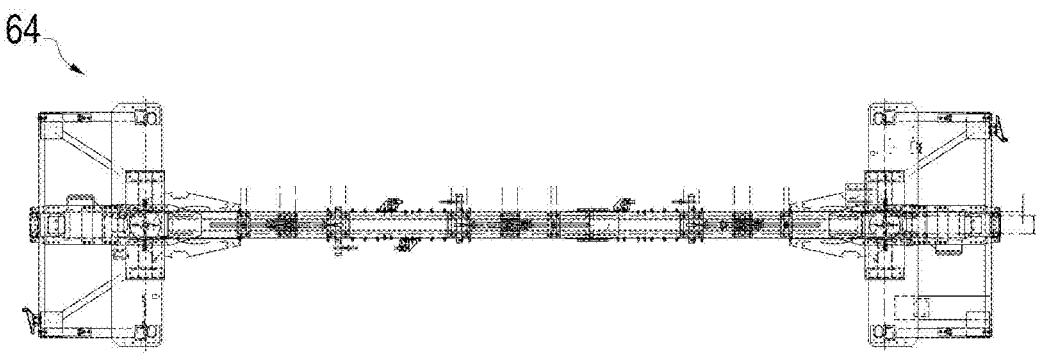
FIG. 18B is a top view of an underframe for the modification railcar of FIG. 18A formed on the cut down hulk of FIG. 16 according to the method of the present invention.
Figure 19A:
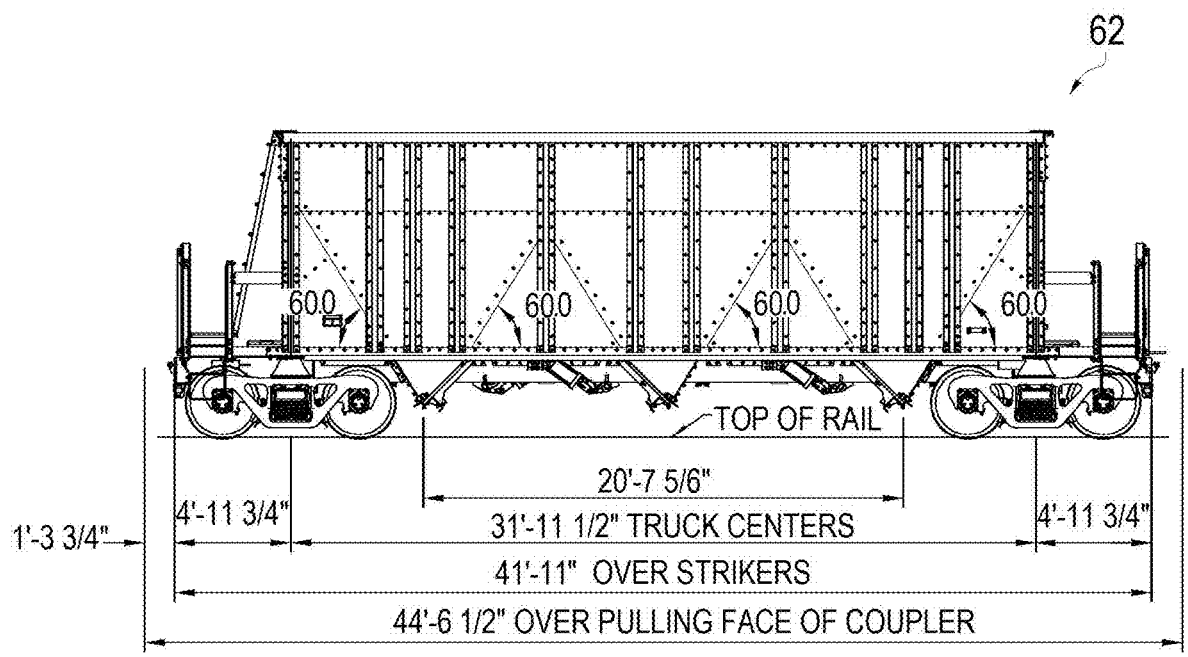
FIG. 19A is a side elevational view of an open top hopper, aggregate hopper, transverse door, hybrid modification railcar according to the method of the present invention.
Figure 19B:
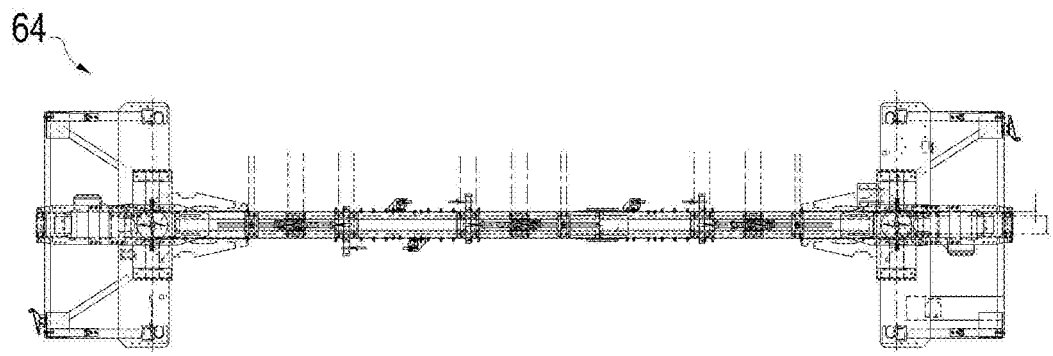
FIG. 19B is a top view of an underframe for the modification railcar of FIG. 19A formed on the cut down hulk of FIG. 16 according to the method of the present invention.
Figure 20A:
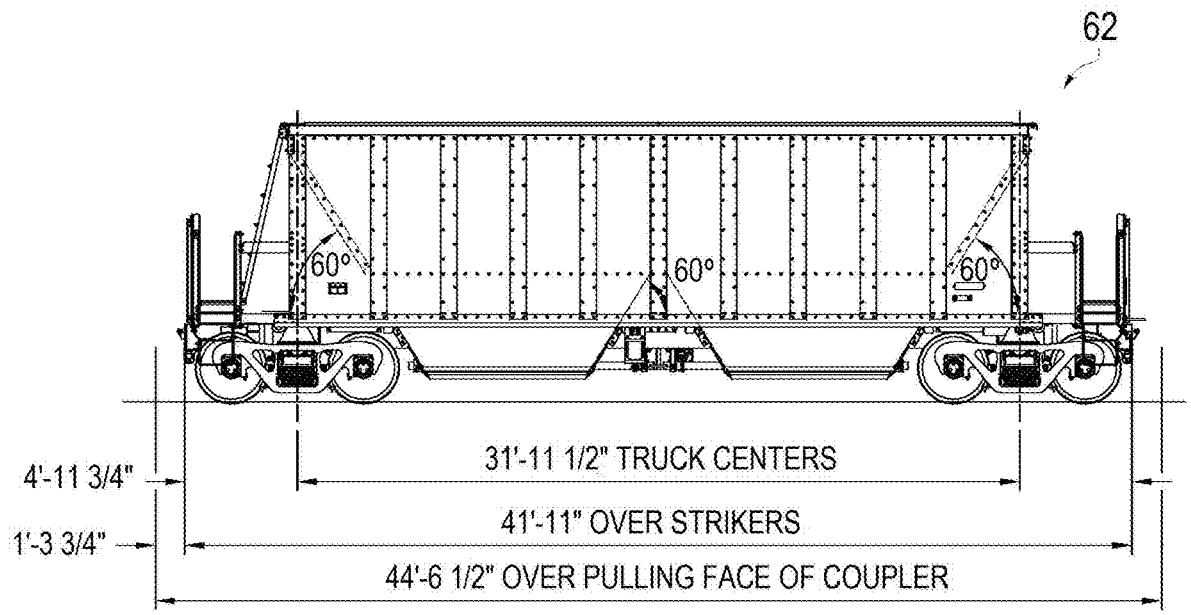
FIG. 20A is a side elevational view of an open top hopper, aggregate hopper, longitudinal door, hybrid modification railcar according to the method of the present invention.
Figure 20B:
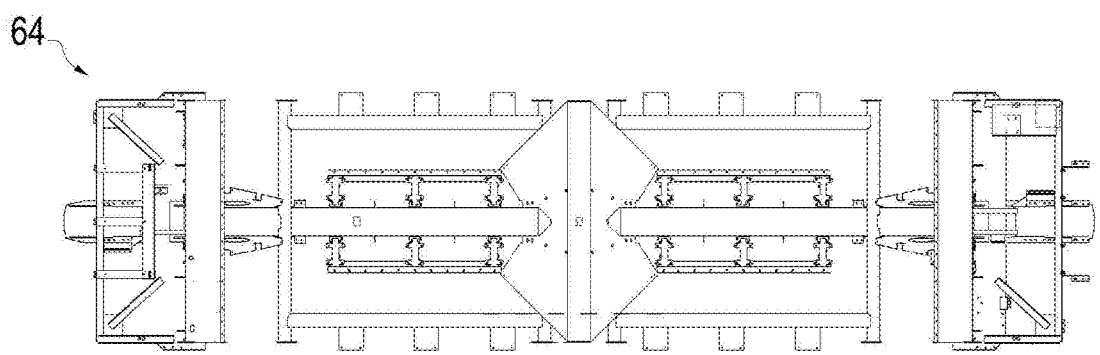
FIG. 20B is a top view of an underframe for the modification railcar of FIG. 20A formed on the cut down hulk of FIG. 17 according to the method of the present invention.
Figure 21A:
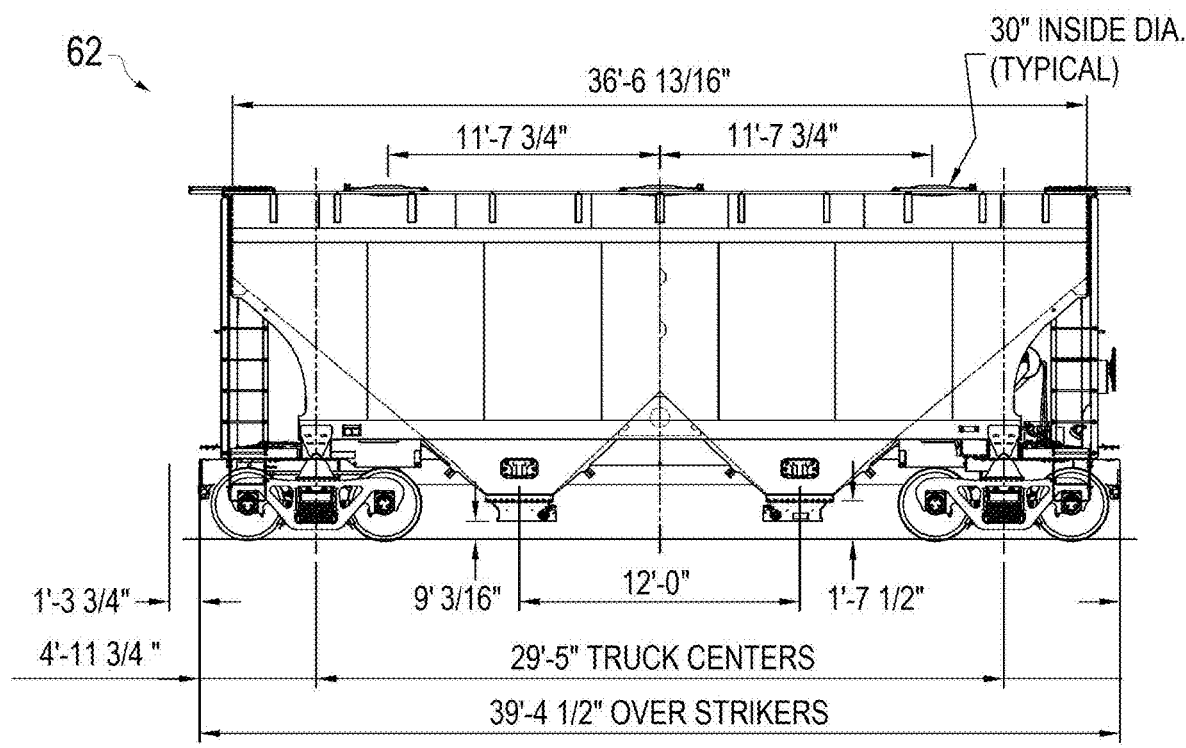
FIG. 21A is a side elevational view of covered hopper, 3282 cf sand, cement or roofing granule modification railcar according to the method of the present invention.
Figure 21B:
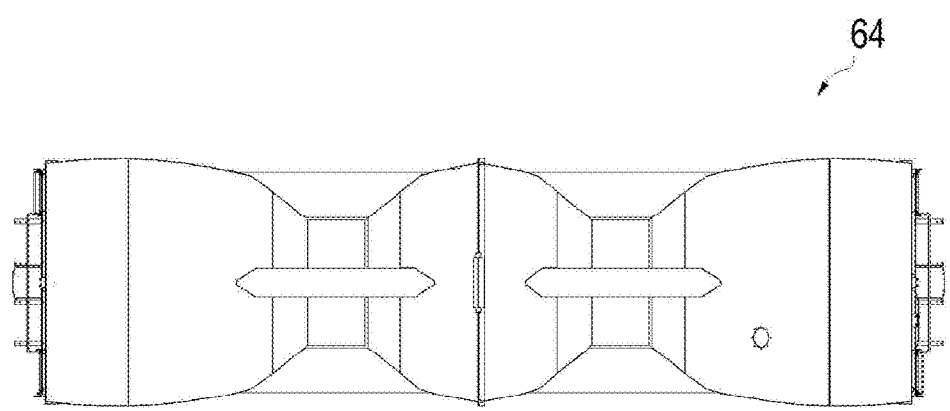
FIG. 21B is a top view of an underframe for the modification railcar of FIG. 21A formed on the cut down hulk of FIG. 17 according to the method of the present invention.
Figure 22A:
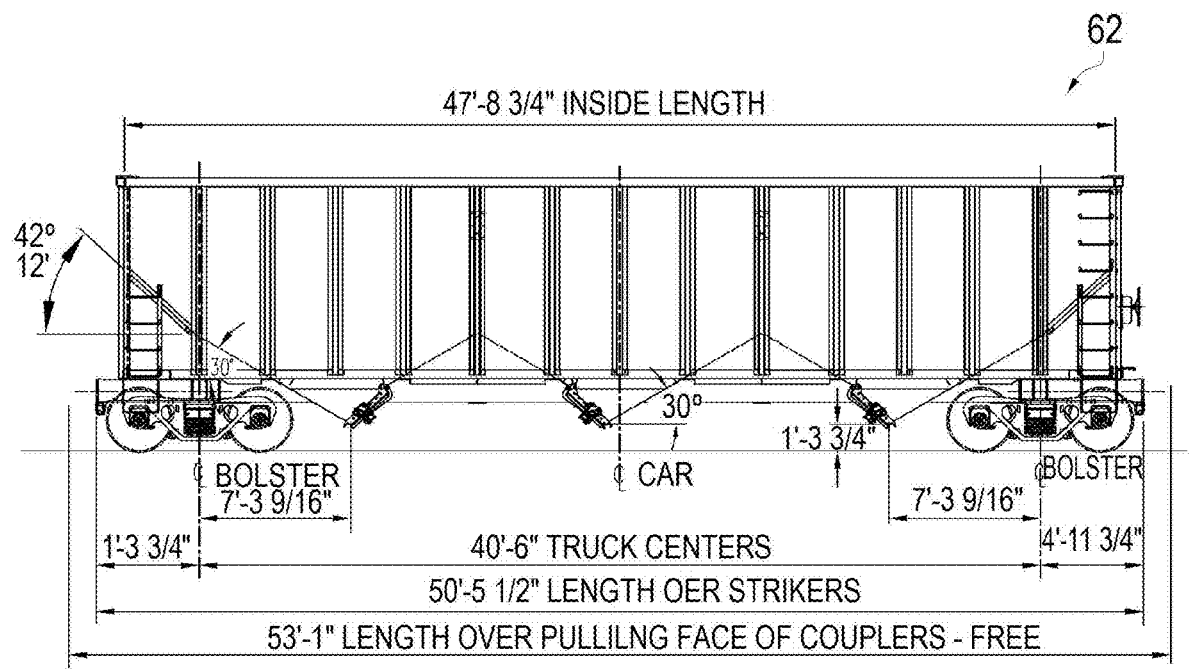
FIG. 22A is a side elevational view of an open top hopper, 4200 cf (western) modification railcar according to the method of the present invention.
Figure 22B:
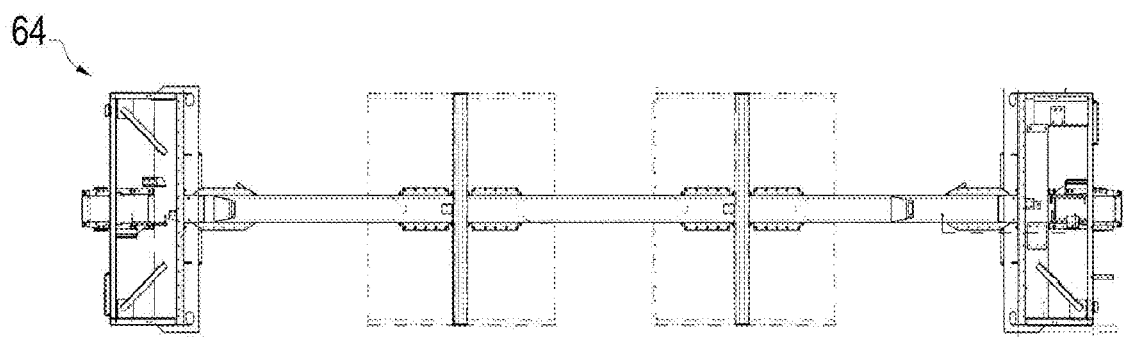
FIG. 22B is a top view of an underframe for the modification railcar of FIG. 22A formed on the cut down hulk of FIG. 17 according to the method of the present invention.
Figure 23A:
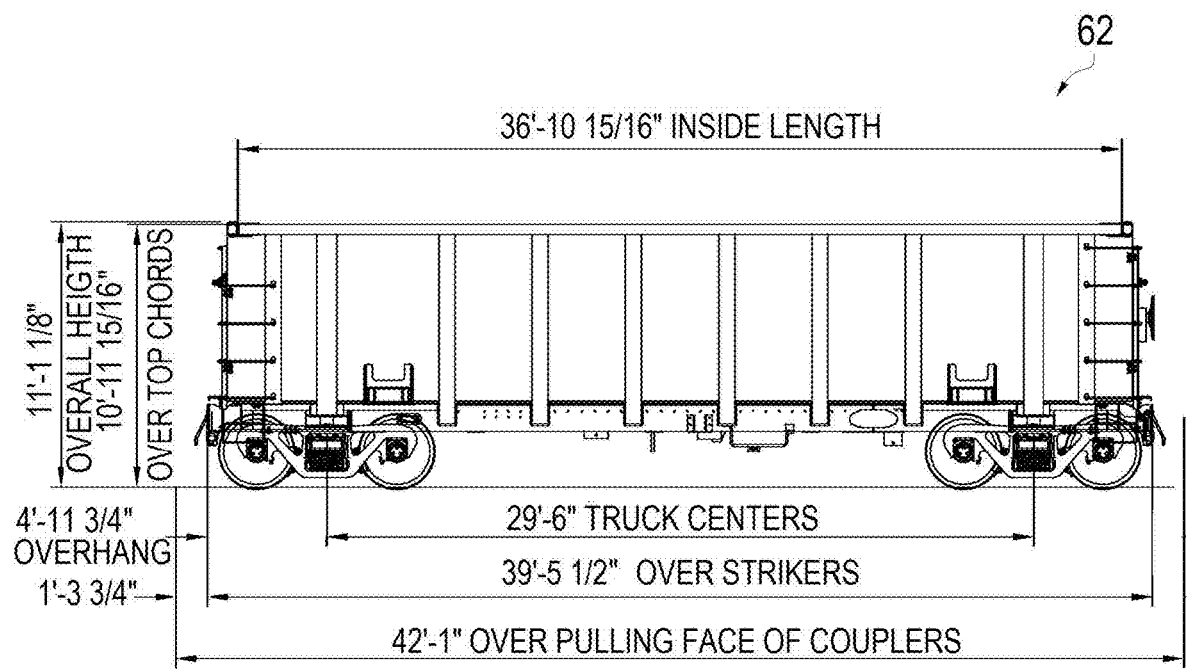
FIG. 23A is a side elevational view of a gondola aggregate modification railcar analogous to the car of FIG. 1 according to the method of the present invention.
Figure 23B:
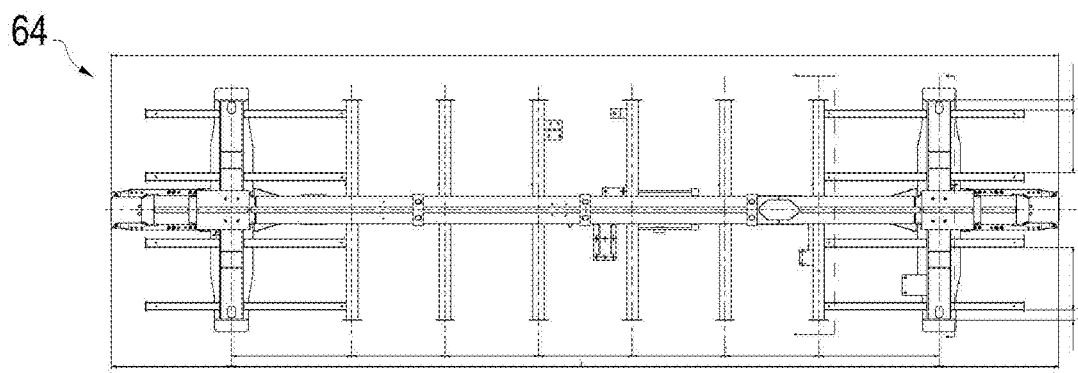
FIG. 23B is a top view of an underframe for the modification railcar of FIG. 23A formed on the cut down hulk of FIG. 10 according to the method of the present invention.
Figure 24A:
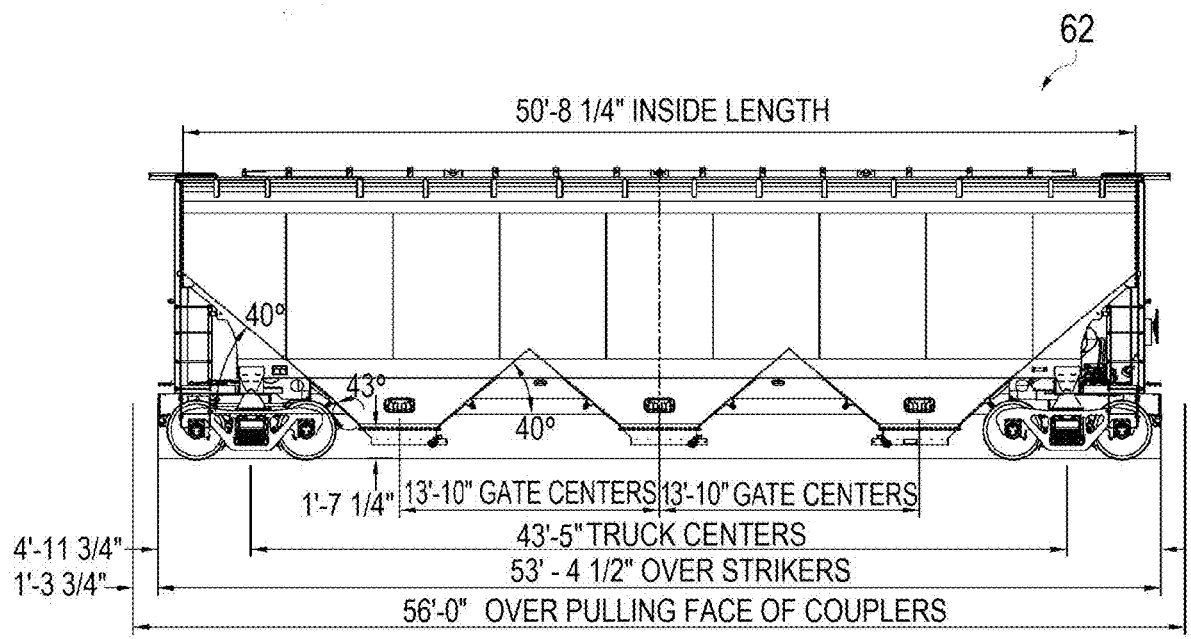
FIG. 24A is a side elevational view of covered hopper, 5200 cf grain modification railcar according to the method of the present invention.
Figure 24B:
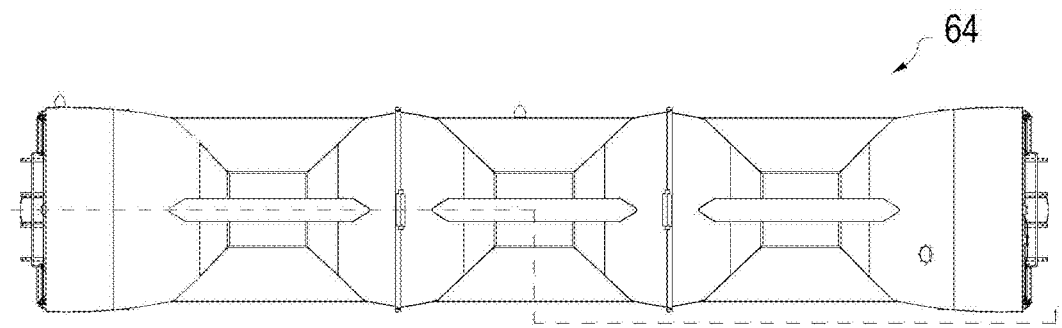
FIG. 24B is a top view of an underframe for the modification railcar of FIG. 24A formed on the cut down hulk of FIG. 17 according to the method of the present invention.
Figure 25A:
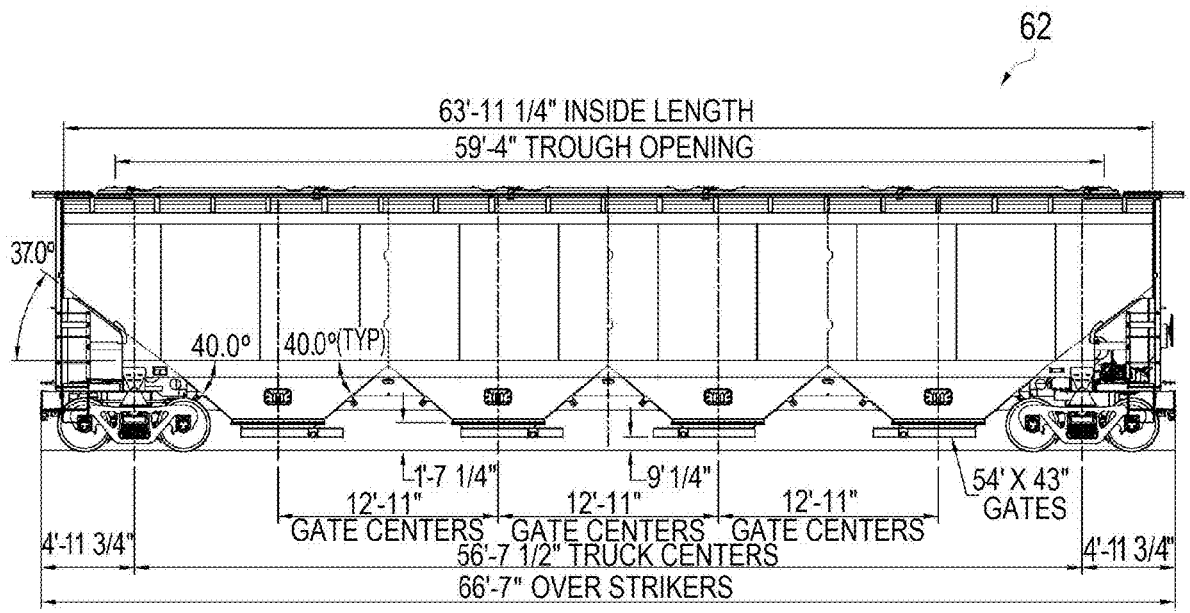
FIG. 25A is a side elevational view of covered hopper, DDG modification car modification railcar according to the method of the present invention.
Figure 25B:
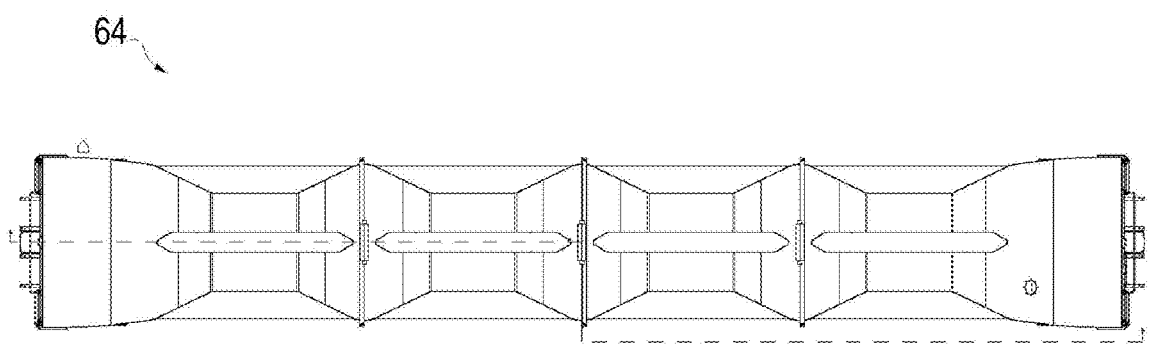
FIG. 25B is a top view of an underframe for the modification railcar of FIG. 25A formed on the cut down hulk of FIG. 16 according to the method of the present invention.
Figure 26A:
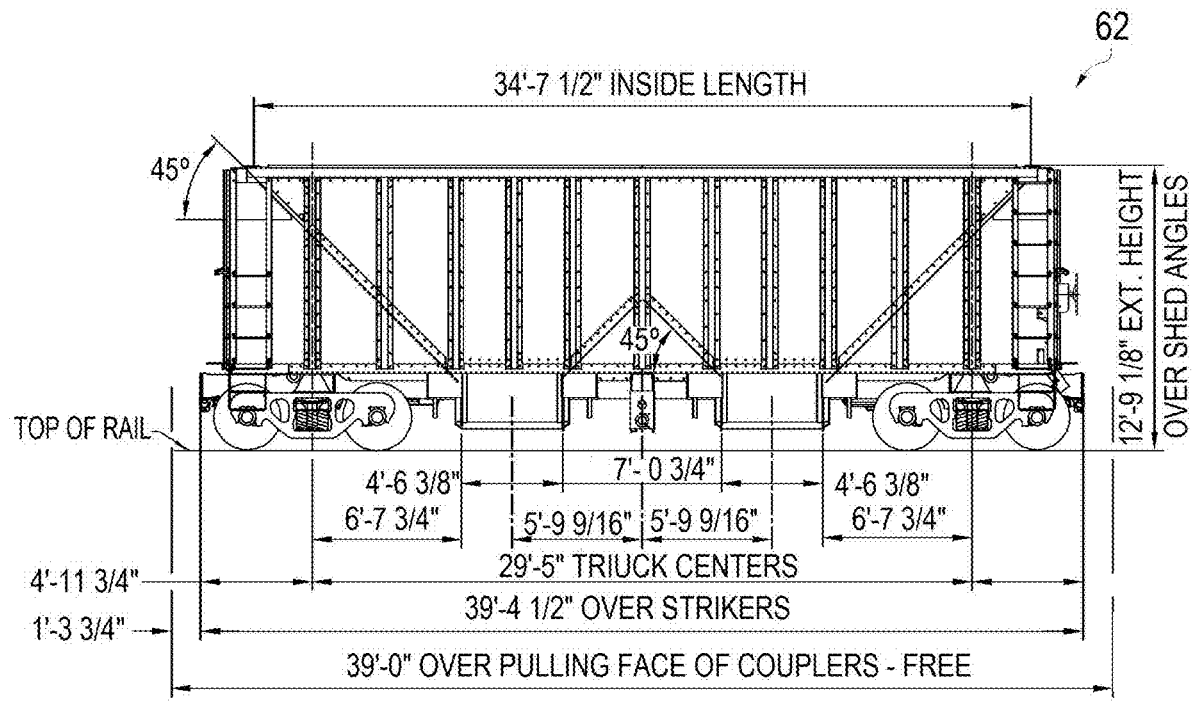
FIG. 26A is a side elevational view of an open top hopper, taconite ore modification railcar according to the method of the present invention.
Figure 26B:
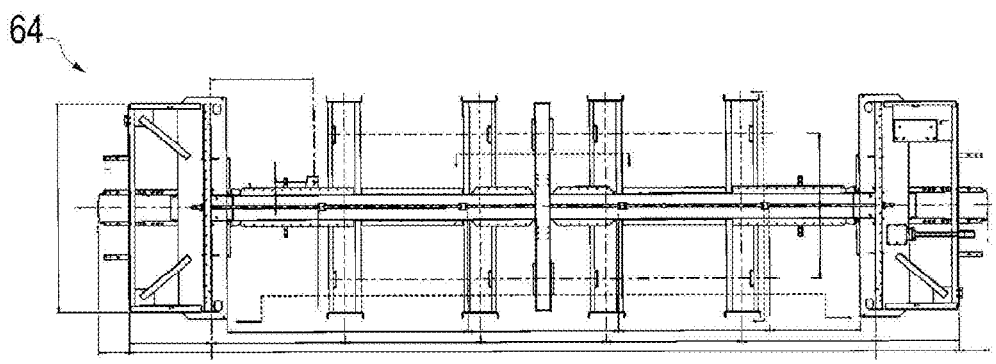
FIG. 26B is a top view of an underframe for the modification railcar of FIG. 26A formed on the cut down hulk of FIG. 17 according to the method of the present invention.
Figure 27A:
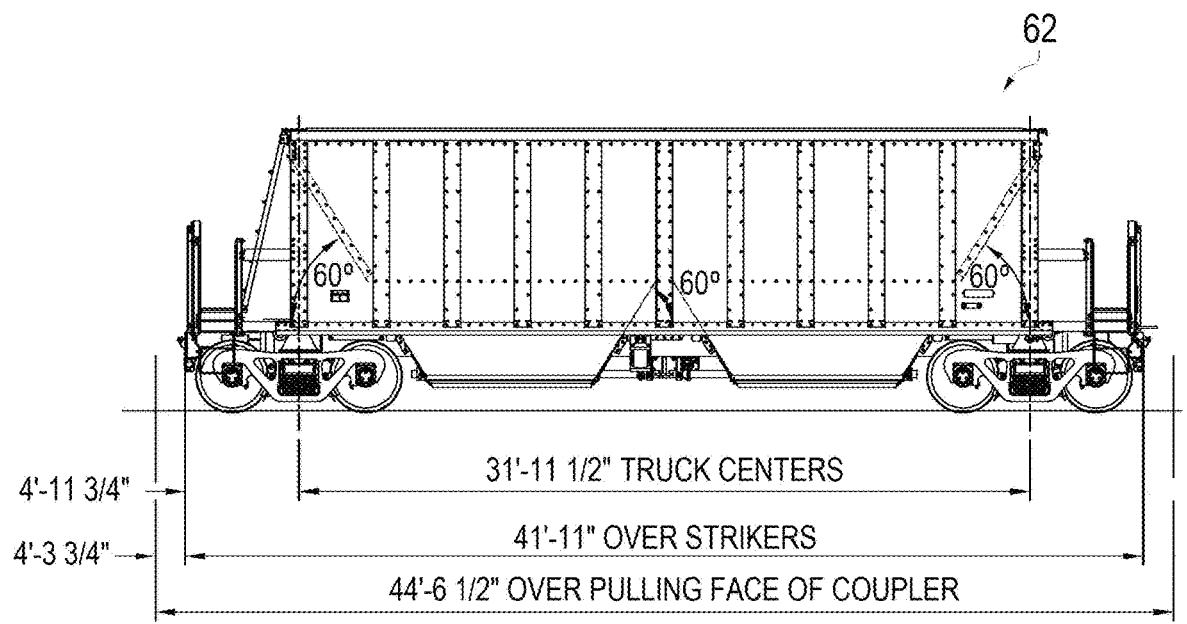
FIG. 27A is a side elevational view of an open top hopper, aggregate hopper, longitudinal door, steel or stainless steel modification railcar according to the method of the present invention.
Figure 27B:
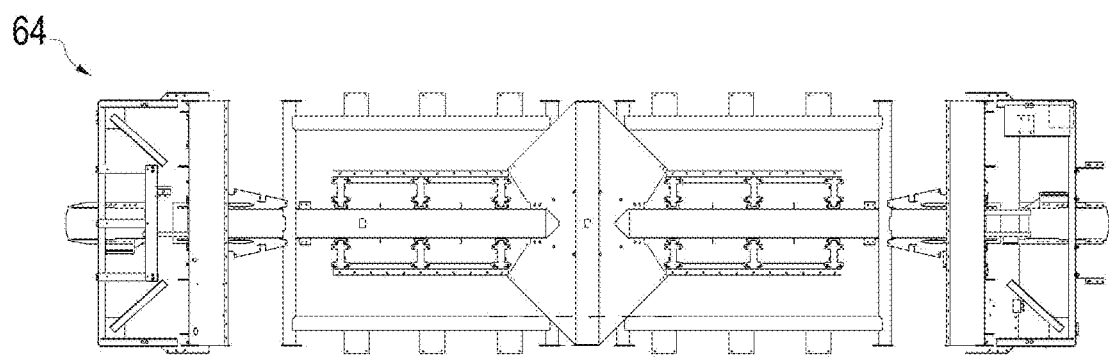
FIG. 27B is a top view of an underframe for the modification railcar of FIG. 20A formed on the cut down hulk of FIG. 17 according to the method of the present invention.
Figure 28A:
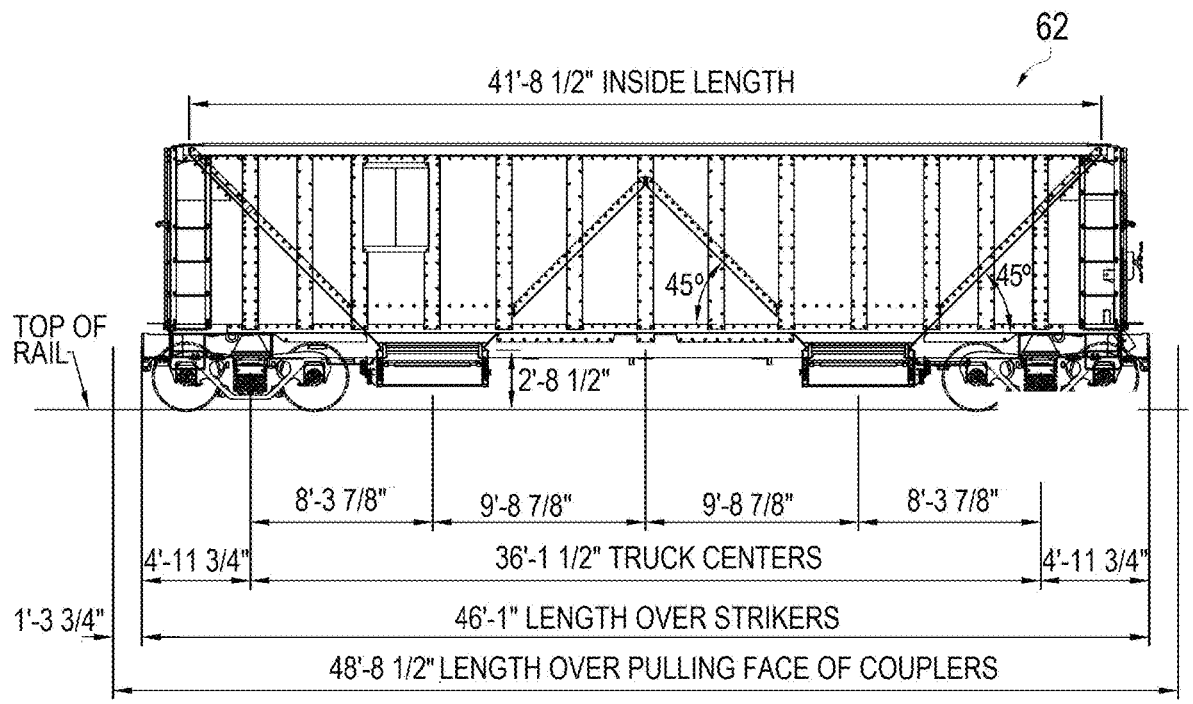
FIG. 28A is a side elevational view of an open top hopper, ballast modification railcar according to the method of the present invention.
Figure 28B:
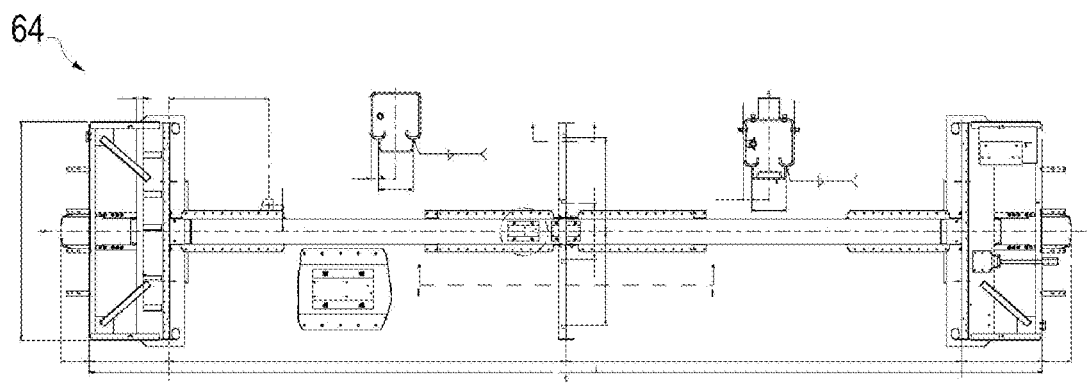
FIG. 28B is a top view of an underframe for the modification railcar of FIG. 28A formed on the cut down hulk of FIG. 17 according to the method of the present invention.
Figure 29A:
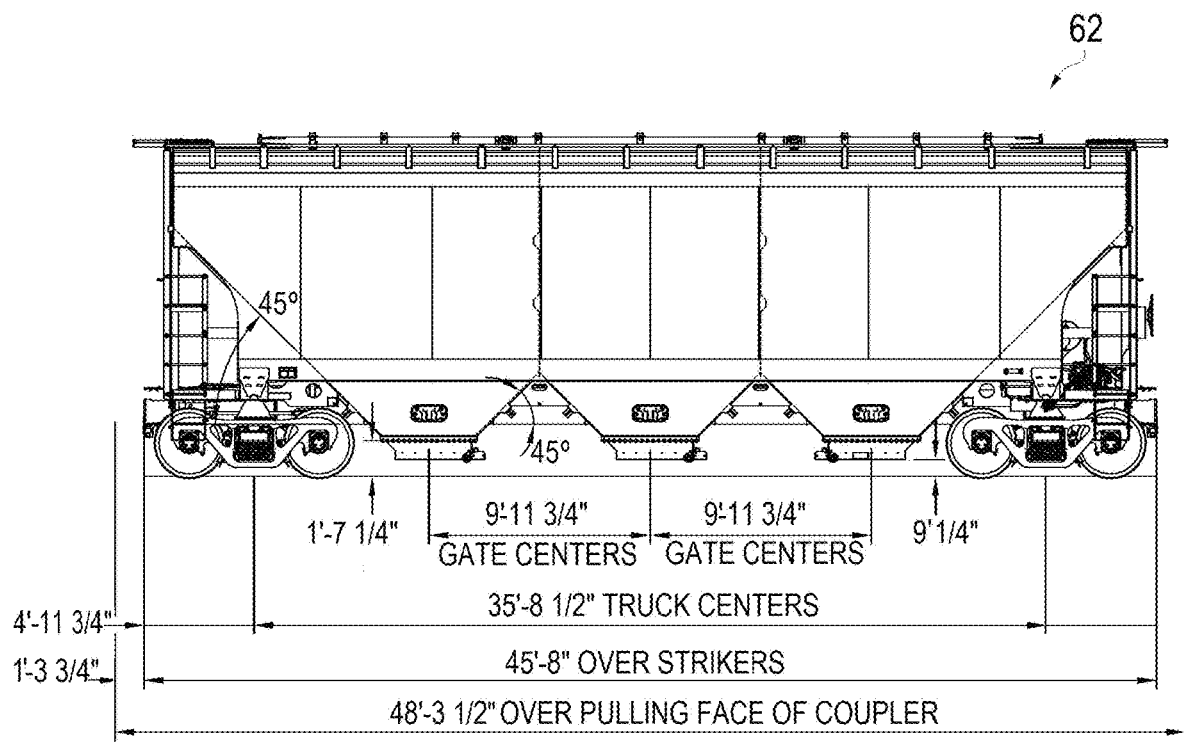
FIG. 29A is a side elevational view of covered hopper, 4300 cf Potash modification railcar according to the method of the present invention.
Figure 29B:
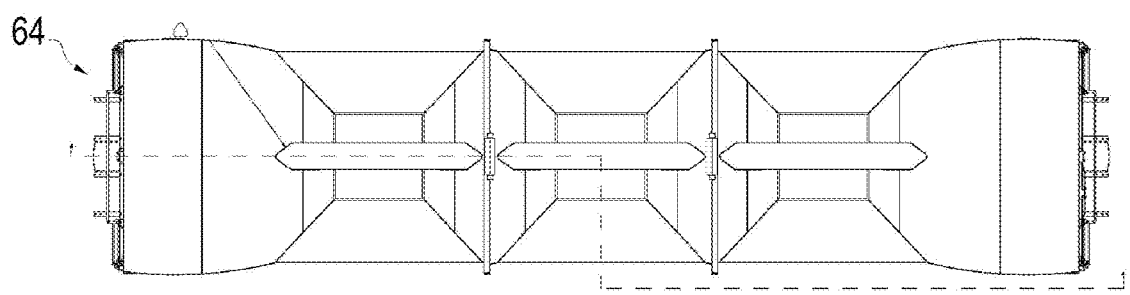
FIG. 29B is a top view of an underframe for the modification railcar of FIG. 29A formed on the cut down hulk of FIG. 17 according to the method of the present invention.
Figure 30A:
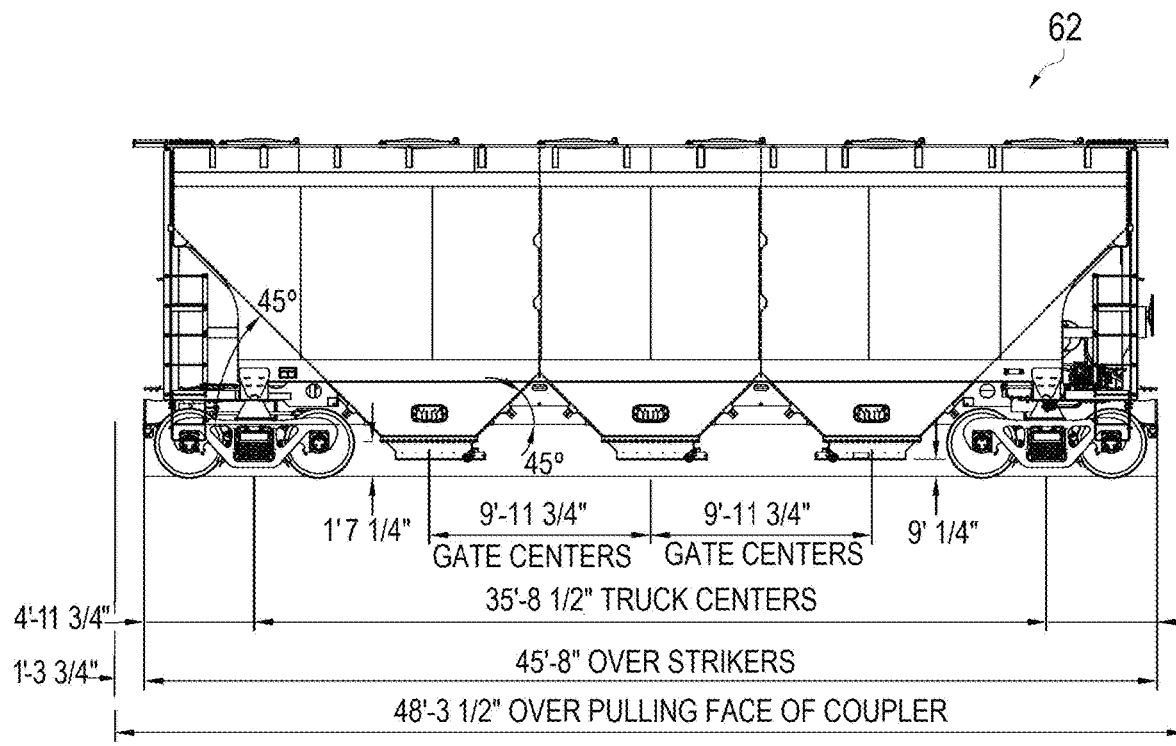
FIG. 30A is a side elevational view of covered hopper, 4300 cf soda ash modification railcar according to the method of the present invention.
Figure 30B:
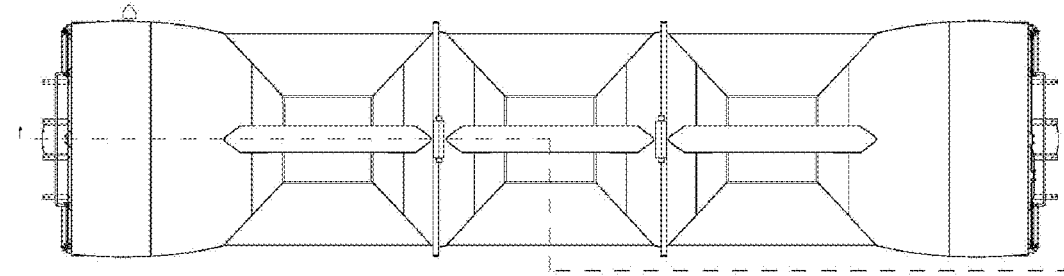
FIG. 30B is a top view of an underframe for the modification railcar of FIG. 30A formed on the cut down hulk of FIG. 17 according to the method of the present invention.
Figure 31A:
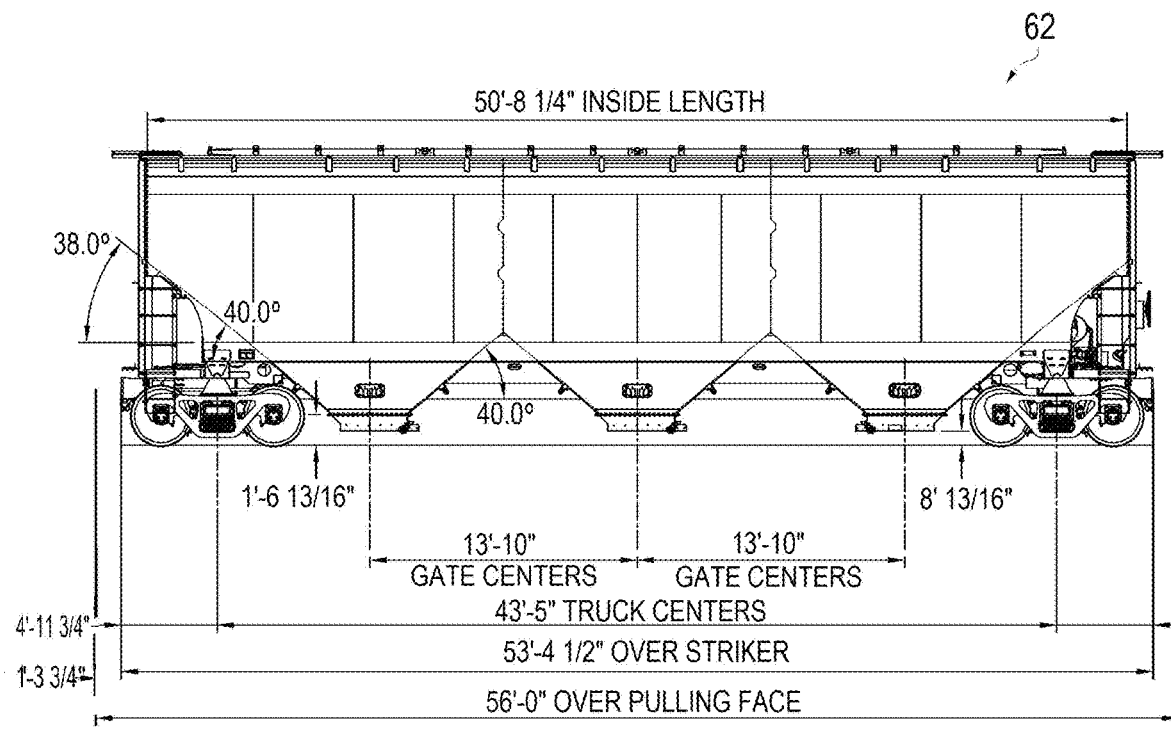
FIG. 31A is a side elevational view of covered hopper, 5400 cf grain modification railcar according to the method of the present invention.
Figure 31B:
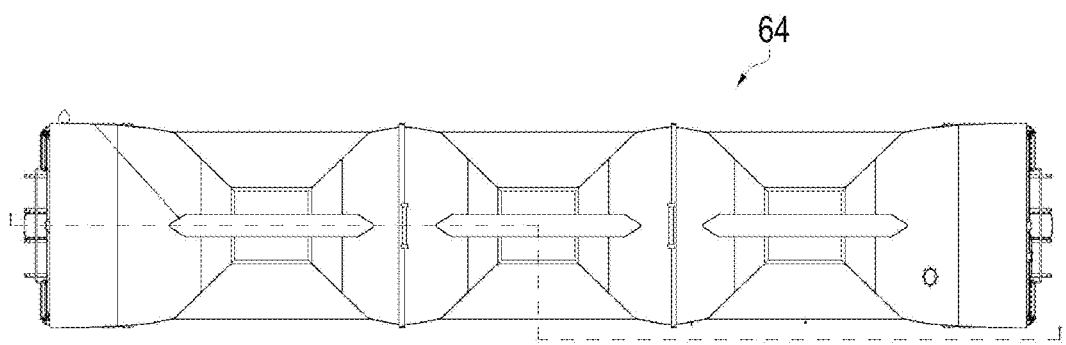
FIG. 31B is a top view of an underframe for the modification railcar of FIG. 31A formed on the cut down hulk of FIG. 17 according to the method of the present invention.
Figure 32A:
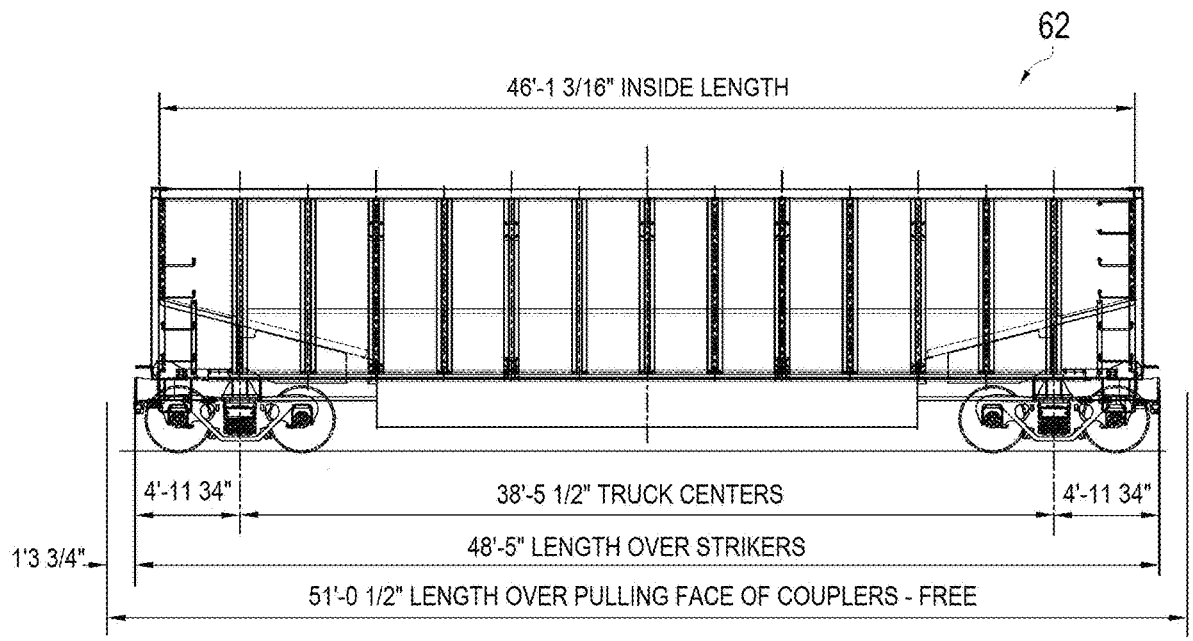
FIG. 32A is a side elevational view of a gondola, eastern coal car modification railcar according to the method of the present invention.
Figure 32B:
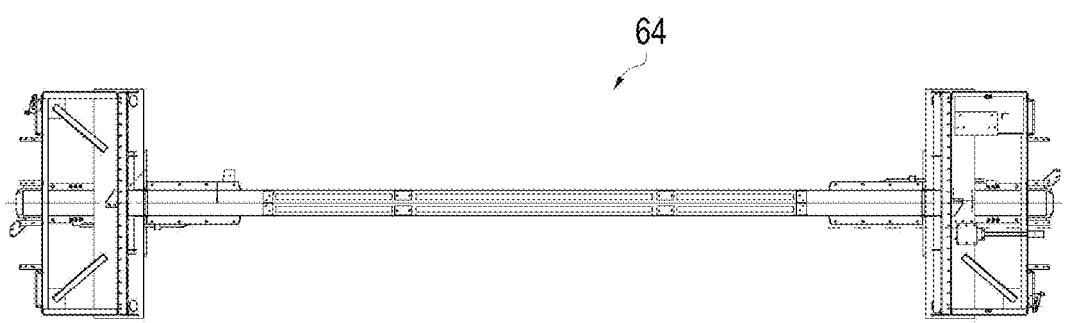
FIG. 32B is a top view of an underframe for the modification railcar of FIG. 32A formed on the cut down hulk of FIG. 17 according to the method of the present invention.
Figure 33A:
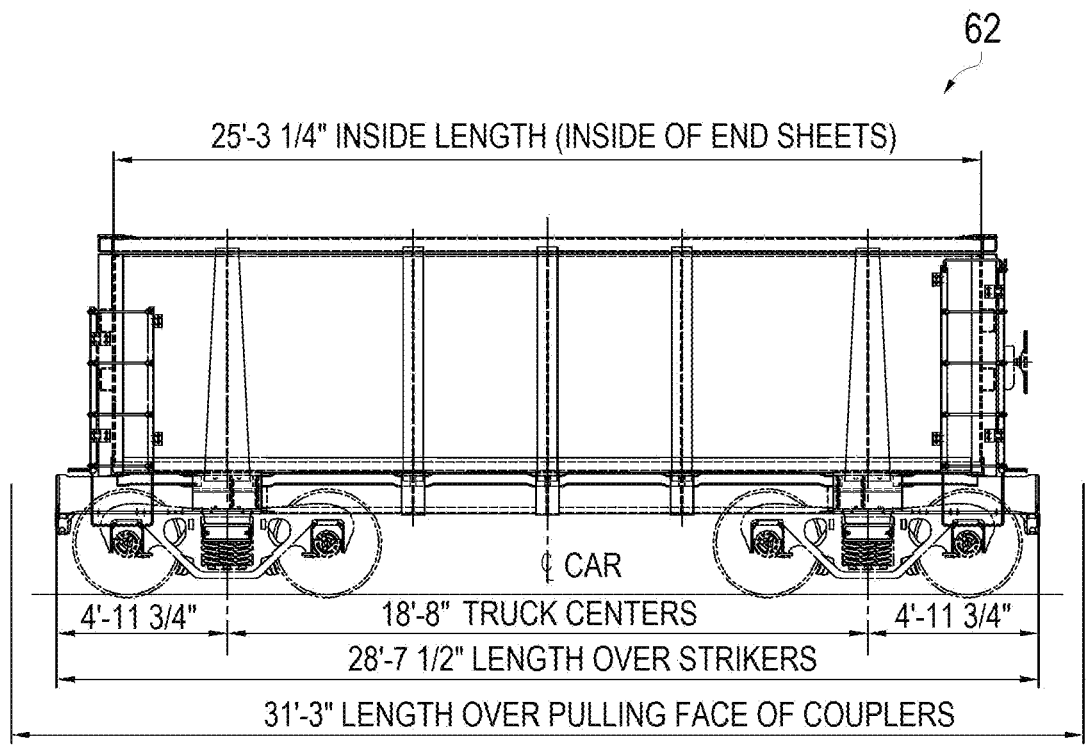
FIG. 33A is a side elevational view of a gondola, ore car modification railcar according to the method of the present invention.
Figure 33B:
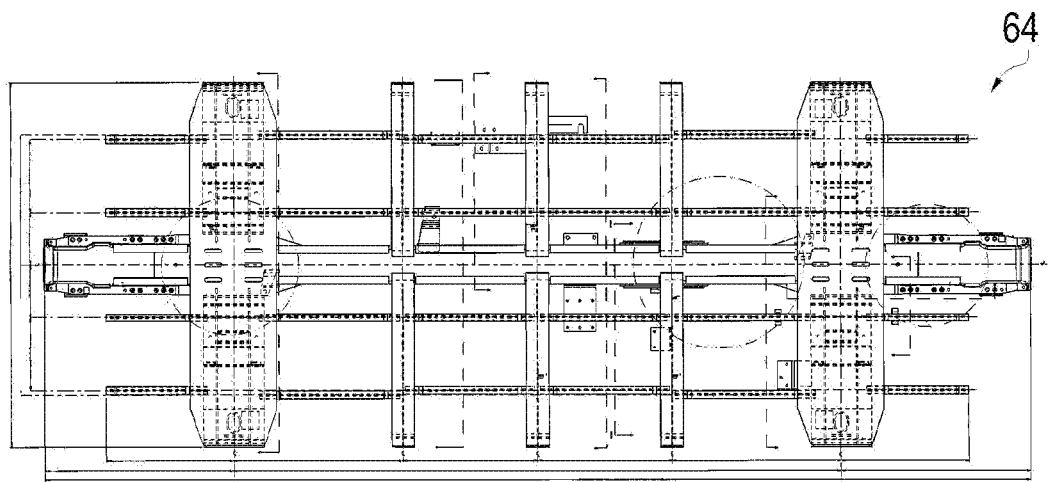
FIG. 33B is a top view of an underframe for the modification railcar of FIG. 33A formed on the cut down hulk of FIG. 16 according to the method of the present invention.
Figure 34A:
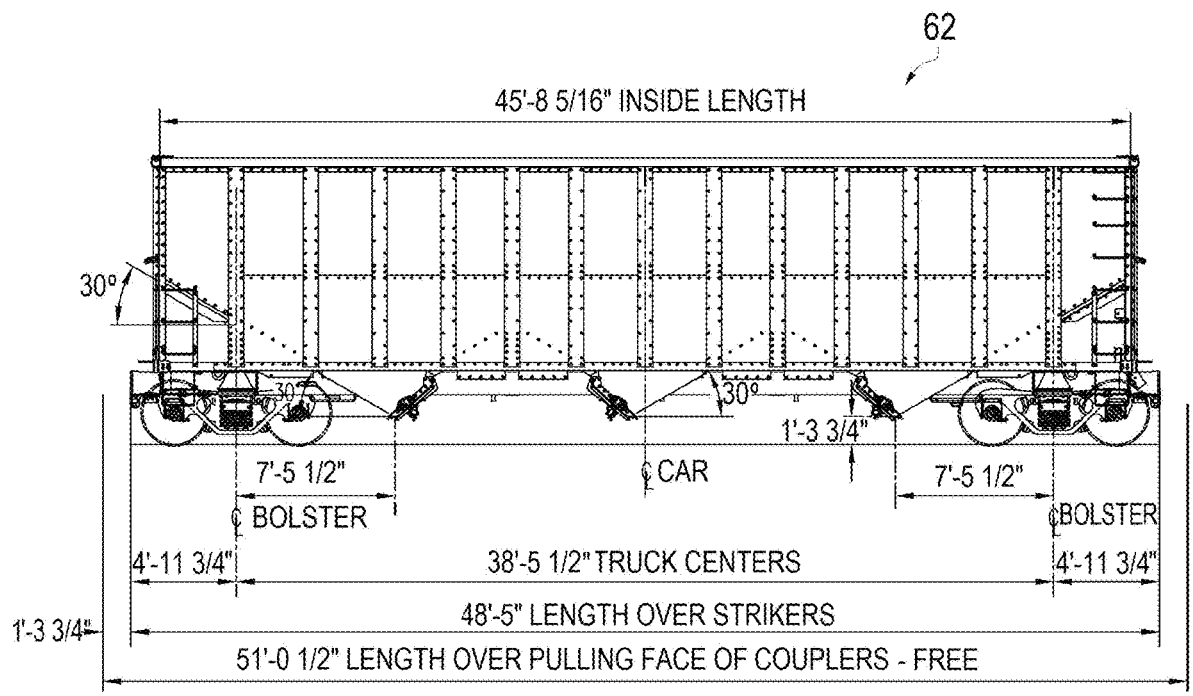
FIG. 34A is a side elevational view of an open top hopper, 4221 cf (eastern) modification railcar according to the method of the present invention.
Figure 34B:
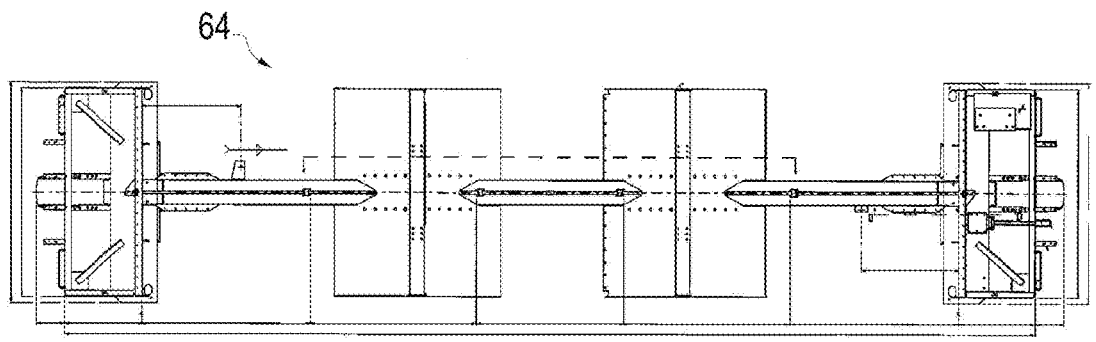
FIG. 34B is a top view of an underframe for the modification railcar of FIG. 34A formed on the cut down hulk of FIG. 17 according to the method of the present invention.
Figure 35A:
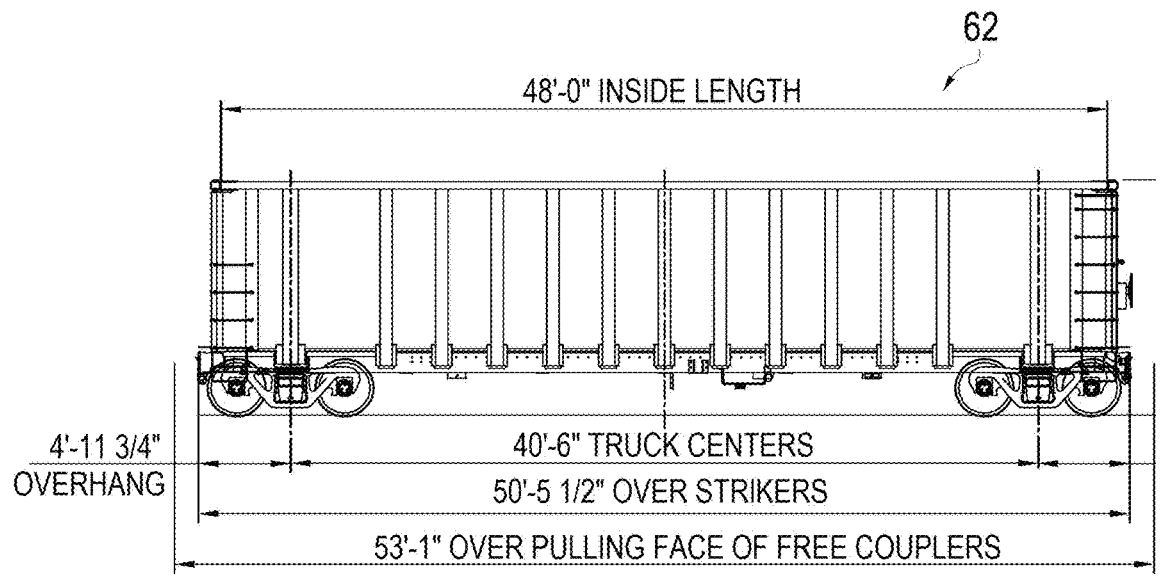
FIG. 35A is a side elevation view of a gondola, C&D car modification railcar according to the method of the present invention.
Figure 35B:
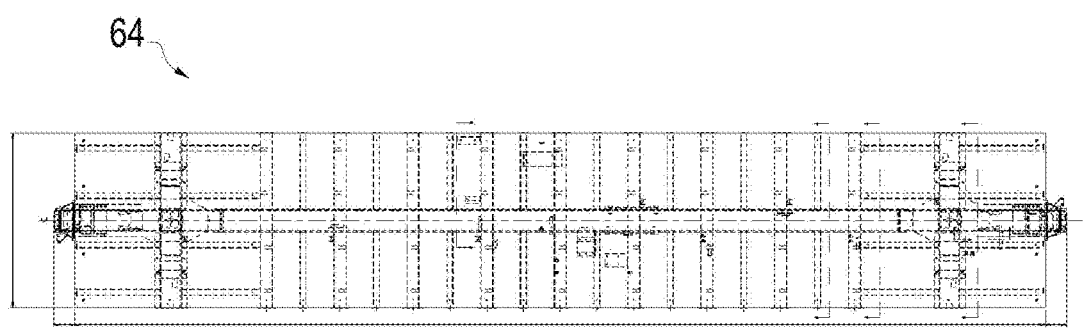
FIG. 35B is a top view of an underframe for the modification railcar of FIG. 35A formed on the cut down hulk of FIG. 10 according to the method of the present invention.
Figure 36A:
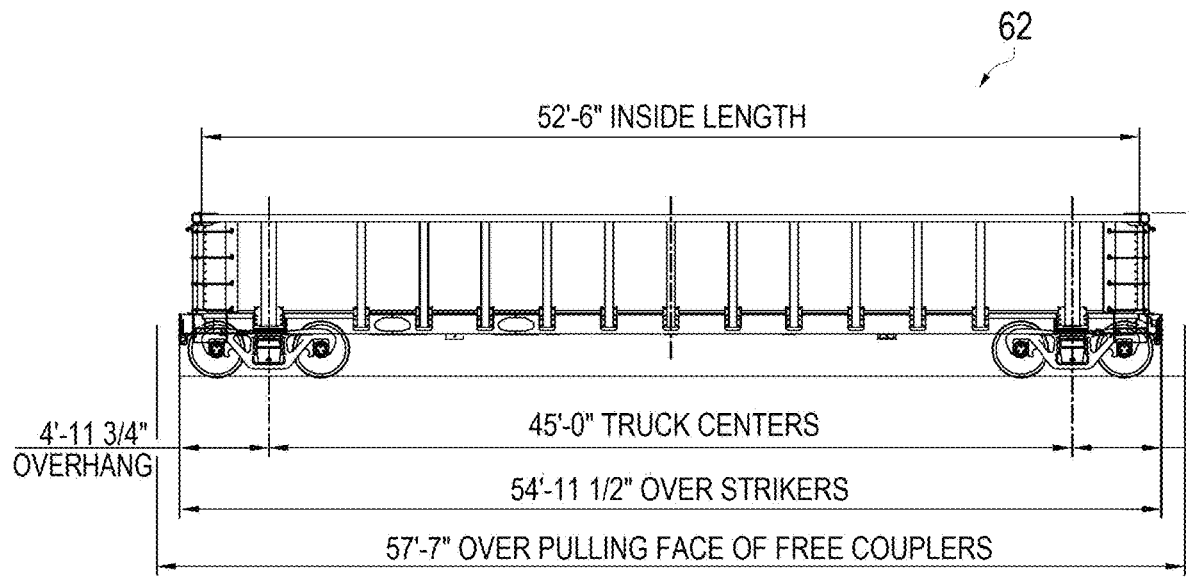
FIG. 36A is a side view of a gondola, 52' mill modification railcar according to the method of the present invention.
Figure 36B:
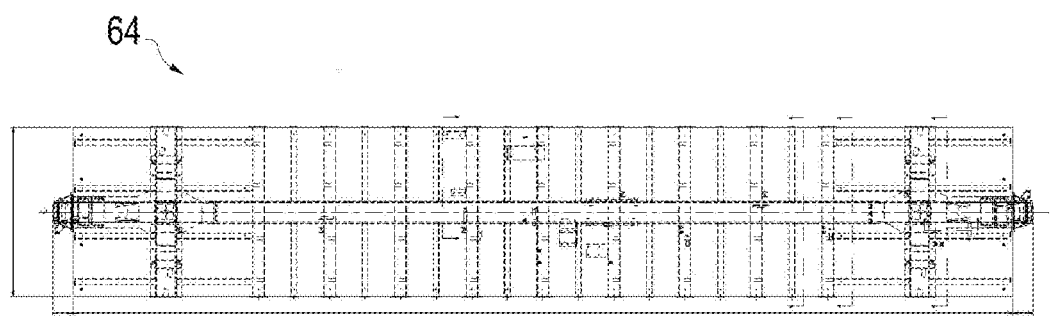
FIG. 36B is a top view of an underframe for the modification railcar of FIG. 36A formed on the cut down hulk of FIG. 10 according to the method of the present invention.
Figure 37A:
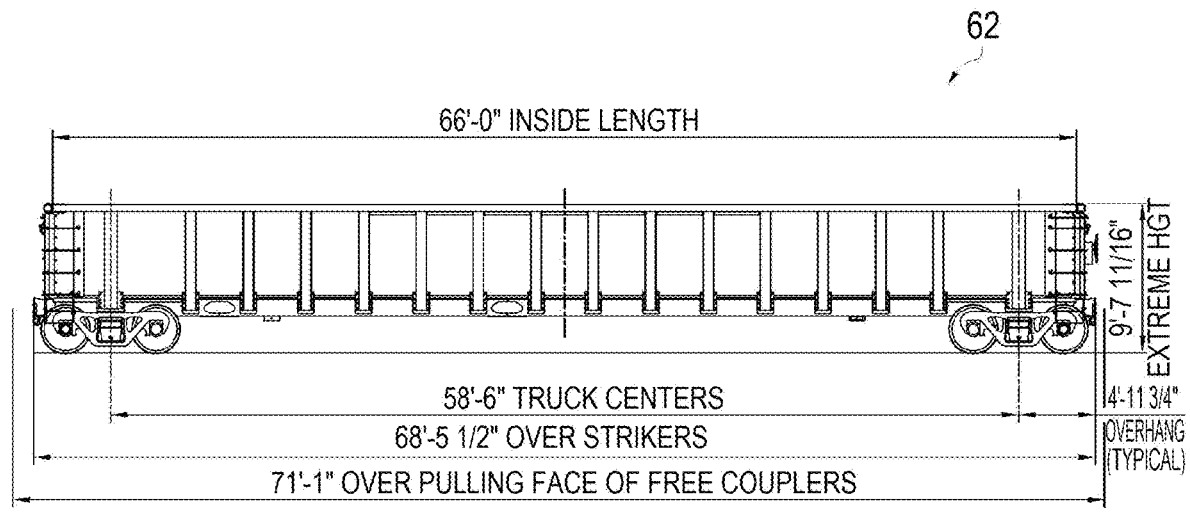
FIG. 37A is a side view of a gondola, 66' mill modification railcar according to the method of the present invention.
Figure 37B:
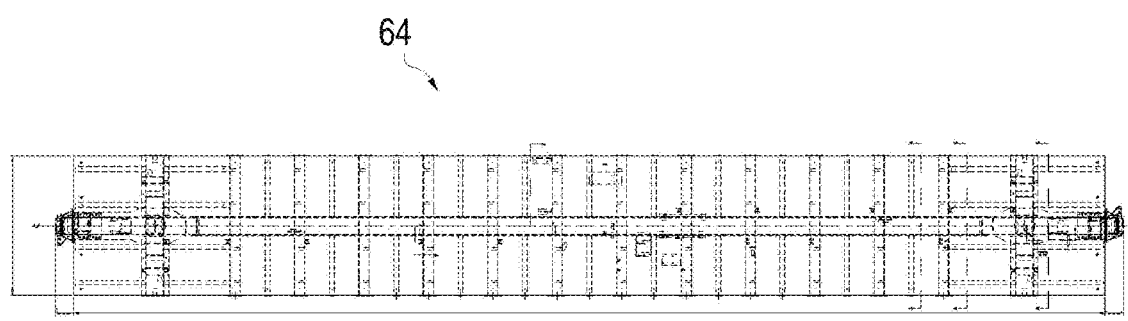
FIG. 37B is a top view of an underframe for the modification railcar of FIG. 37A formed on the cut down hulk of FIG. 10 according to the method of the present invention.

The existing railcar 60 is modified to form a modified railcar 10 or 62 which is one of the following gondola, open top hopper and covered hopper railcar types:
 i) A gondola, aggregate car 10 of FIGS. 1-8 described above (and also FIG. 23A in slightly modified form and bearing reference numeral 62) may be formed, which car 10 (or 62 for FIG. 23A) can also be defined as an open top, flat bottom gondola preferably with a cold formed center sill 32, with no interior bracing, pinned top chord connections, and end lower slope plates and four corner cleanout doors for ease of cleaning, primarily designed for hauling aggregate. Generally the process is as described above, namely the components that are to be reused are removed from the car 60 of FIG. 9 and the cut down hulk of FIG. 10 is formed as discussed above, then the underframe of FIG. 2 (or FIG. 23B) is formed then the upper body and reused components added as generally shown in FIG. 1 (or FIG. 23A).
 ii) A gondola, 52' or 66' mill car 62 shown in FIGS. 36A and 37A respectively, each of which car 62 can also be defined as an open top, flat bottom gondola preferably with a cold formed center sill 32, with no interior bracing, pinned top chord connections, and end lower slope plates, welded and mechanically fastened sides, and designed for general gondola service Generally the process is analogous to that described above, namely the components that are to be reused for car 62 are removed from the car 60 of FIG. 9 and the cut down hulk of FIG. 10 is formed as discussed above. There may be minor variations in the hulk from that shown in FIG. 10 but the figure shows the main structural components of this modification. Then the underframe 64 of FIG. 36B or 37B, respectively, is formed then the upper body and reused components added as generally shown in the car design of FIGS. 36A and 37A respectively.
 iii) A gondola, C&D car 62 shown in FIG. 35A may be formed from car 60 and the gondola, C&D car 62 can also be defined as an open top, flat bottom gondola preferably with a cold formed center sill 32, with no interior bracing, pinned top chord connections, and end lower slope plates, welded and mechanically fastened sides, tapered sides stakes, and designed for construction and debris material service. Again the process is analogous to that described above, namely the components that are to be reused for car 62 of FIG. 35A are removed from the car 60 of FIG. 9 and the cut down hulk having the main structural components of FIG. 10 is formed as discussed above. Then the underframe 64 of FIG. 35B is formed then the upper body and reused components added as generally shown in the car design of FIG. 35A.
 iv) A gondola, eastern coal car 62 design shown in FIG. 32A may be formed and the gondola, eastern coal car 62 design can be defined herein as an open top, all steel underframe with through preferably cold formed center sill 32, steel outside stake, two piece composite side with lower margin stainless steel and upper margin aluminum, slopped intermediate floor, two interior K braces with three additional top ties (separate from the K braces), twin stainless steel rounded bottom tubs designed primarily for carrying coal. The process is analogous to, but slightly different from that described above, namely the components that are to be reused for car 62 of FIG. 32A are removed from the car 60 of FIG. 9 and the cut down hulk having the main structural components of FIG. 17 is formed analogous to the process described above in connection with FIG. 10. Then the underframe 64 of FIG. 32B is formed followed by the upper body and reused components being added as generally shown in the car design of FIG. 32A.
 v) A gondola, ore car 62 design shown in FIG. 33A may be formed and the gondola ore car 62 design can also be defined as an open top, flat bottom gondola preferably with a cold formed center sill 32, with no interior bracing, pinned top chord connections, and end lower slope plates, tapered sides stakes, and designed for hauling ore. The process again is analogous to, but slightly different from that described above, namely the components that are to be reused for car 62 of FIG. 33A are removed from the car 60 of FIG. 9 and the cut down hulk having the main structural components of FIG. 16 is formed analogous to the process described above in connection with FIGS. 10 and 17. Then the underframe 64 of FIG. 33B is formed followed by the upper body and reused components being added as generally shown in the car design of FIG. 33A.
 vi) An open top hopper, 4200 cf (western) as shown in FIG. 22A or 4221 cf (eastern) as shown in FIG. 34A, modification car 62 may be formed. This modification car 62 type may be defined as an open top three pocket hopper car, all steel underframe, stainless steel body, fastened side construction, through center sill (preferably cold formed center sill 32) and designed for hauling coke and similar lading. The process again is analogous to that described above, namely the components that are to be reused for car 62 of one of FIG. 22A or 34A are removed from the car 60 of FIG. 9 and the cut down hulk having the main structural components of FIG. 17 is formed analogous to the process described above in connection with FIG. 10. Then the underframe 64 of one of FIG. 22B or 34B is formed followed by the upper body and reused components being added as generally shown in the car design of one of FIG. 22A or 34A.
 vii) An open top hopper, taconite ore modification car 62 as shown in FIG. 26A may be formed and open top hopper, taconite ore modification car 62 may be defined as an open top, four longitudinal doors, hopper car, all steel construction, fastened side construction, through center sill (preferably cold formed center sill 32) and designed for hauling ore, specifically taconite ore. The process is analogous to that described above, namely the components that are to be reused for car 62 of FIG. 26A are removed from the car 60 of FIG. 9 and the cut down hulk having the main structural components of FIG. 17 is formed analogous to the process described above in connection with FIG. 10. Then the underframe 64 of FIG. 26B is formed followed by the upper body and reused components being added as generally shown in the car design of FIG. 26A.

viii) An open top hopper, ballast modification car 62 as shown in FIG. 28A may be formed and open top hopper, ballast modification car 62 may be defined as an open top, four longitudinal ballast outlet gates (8 doors), hopper car, all steel construction, fastened side construction, through center sill (preferably cold formed center sill 32) and designed for hauling ballast. The process is analogous to that described above, namely the components that are to be reused for car 62 of FIG. 28A are removed from the car 60 of FIG. 9 and the cut down hulk having the main structural components of FIG. 17 is formed analogous to the process described above in connection with FIG. 10. Then the underframe 64 of FIG. 28B is formed followed by the upper body and reused components being added as generally shown in the car design of FIG. 28A.

ix) An open top hopper, aggregate hopper, transverse door (a steel or stainless steel version shown in FIG. 18A or a hybrid version shown in FIG. 19A) modification car may be formed which can also be defined as an open top, hopper, all steel underframe, three hopper pockets, fastened side construction, through center sill (preferably cold formed center sill 32), with pneumatic door operating system for independent or simultaneous door operation with integrated touch panel control, and designed for hauling aggregate. The process again is analogous to that described above, namely the components that are to be reused for car 62 of one of FIG. 18A or 19A are removed from the car 60 of FIG. 9 and the cut down hulk having the main structural components of FIG. 16 is formed analogous to the process described above in connection with FIG. 10 or 17. Then the underframe 64 of one of FIG. 18B or 19B is formed followed by the upper body and reused components being added as generally shown in the car design of one of FIG. 18A or 19A.

x) An open top hopper, aggregate hopper, longitudinal door (hybrid version shown in FIG. 20A, steel or stainless steel version shown in FIG. 27A) modification car 62 may be formed which can also be defined as an open top, hopper, all steel underframe, four hopper pockets, fastened side construction, through center sill (preferably cold formed center sill 32), with pneumatic door operating system for independent or simultaneous door operation with integrated touch panel control, and designed for hauling aggregate. The process again is analogous to that described above, namely the components that are to be reused for car 62 of one of FIG. 20A or 27A are removed from the car 60 of FIG. 9 and the cut down hulk having the main structural components of FIG. 17 is formed analogous to the process described above in connection with FIG. 10. Then the underframe 64 of one of FIG. 20B or 27B is formed followed by the upper body and reused components being added as generally shown in the car design of one of FIG. 20A or 27A.

xi) A covered hopper, 3282 cf sand, cement or roofing granule modification car 62 as shown in FIG. 21A may be formed and which can be defined as all steel underframe, through center sill (preferably a cold formed center sill 32), two bolt on hopper gates, welded curved roof, welded curved side construction, and round loading hatches designed primarily for hauling sand, cement or roofing granules. The process is analogous to that described above, namely the components that are to be reused for car 62 of FIG. 21A are removed from the car 60 of FIG. 9 and the cut down hulk having the main structural components of FIG. 17 is formed analogous to the process described above in connection with FIG. 10. Then the underframe 64 of FIG. 21B is formed followed by the upper body and reused components being added as generally shown in the car design of FIG. 21A.

xii) A covered hopper, 4300 cf potash modification car 62 as shown in FIG. 29A may be formed which can be defined as all steel underframe, through center sill (preferably a cold formed center sill 32), three bolt on hopper gates, welded curved roof, welded curved side construction, and longitudinal trough loading hatches designed primarily for potash. The process is analogous to that described above, namely the components that are to be reused for car 62 of FIG. 29A are removed from the car 60 of FIG. 9 and the cut down hulk having the main structural components of FIG. 17 is formed analogous to the process described above in connection with FIG. 10. Then the underframe 64 of FIG. 29B is formed followed by the upper body and reused components being added as generally shown in the car design of FIG. 29A.

xiii) A covered hopper, 4300 cf soda ash modification car 62 as shown in FIG. 30A which can be defined as all steel underframe, through center sill (preferably a cold formed center sill 32), three bolt on hopper gates, welded curved roof, welded curved side construction, and round loading hatches designed primarily for hauling soda ash. The process is analogous to that described above, namely the components that are to be reused for car 62 of FIG. 30A are removed from the car 60 of FIG. 9 and the cut down hulk having the main structural components of FIG. 17 is formed analogous to the process described above in connection with FIG. 10. Then the underframe 64 of FIG. 30B is formed followed by the upper body and reused components being added as generally shown in the car design of FIG. 30A.

xiv) A covered hopper, 5200 cf version shown in FIG. 24A or 5400 cf version shown in FIG. 31A, grain modification car 62 may be formed and may be defined as all steel underframe, through center sill (preferably a cold formed center sill 32), three bolt on hopper gates, welded curved roof, welded curved side construction, and longitudinal trough loading hatches designed primarily for grain. The process again is analogous to that described above, namely the components that are to be reused for car 62 of one of FIG. 24A or 31A are removed from the car 60 of FIG. 9 and the cut down hulk having the main structural components of FIG. 17 is formed analogous to the process described above in connection with FIG. 10. Then the underframe 64 of one of FIG. 24B or 31B is formed followed by the upper body and reused components being added as generally shown in the car design of one of FIG. 24A or 31A.

xv) A covered hopper, DDG modification car 62 may be formed as shown in FIG. 25A and which can be defined as all steel underframe, through center sill (preferably a cold formed center sill 32), four bolt on hopper gates, welded curved roof, welded curved side construction, and longitudinal trough loading hatches designed primarily for dried distillers grain (DDG). The process again is analogous to that described above, namely the components that are to be reused for car 62 of FIG. 25A are removed from the car 60 of FIG. 9 and the cut down hulk having the main structural components of FIG. 16 is formed analogous to the process described above in connection with FIG. 10 or 17. Then the underframe 64 of FIG. 25B is formed followed by the upper body and reused components being added as generally shown in the car 62 design of FIG. 25A.

xvi) A covered hopper, pellet modification car defined as all steel underframe, stub center sill (preferably a cold formed center sill 32), four bolt on hopper gates, welded curved roof, welded curved side construction, and round loading hatches designed primarily for plastic pellets. The process again is analogous to that described above, namely the components that are to be reused for known pellet car configuration are removed from the car 60 of FIG. 9 and the cut down hulk having the main structural components of FIG. 10. Then the underframe for the conventional pellet car is formed followed by the upper body and reused components being added to form the pellet car.

Although the present invention has been described with particularity herein, the scope of the present invention is not limited to the specific embodiment disclosed. It will be apparent to those of ordinary skill in the art that various modifications may be made to the present invention without departing from the spirit and scope thereof. The scope of the present invention should be defined by the appended claims and equivalents thereto.

What is claimed is:

1. A method of modification of a railcar with a cold formed center sill comprising the steps of:
   providing an existing railcar with a cold formed center sill;
   removing an upper portion of the existing railcar including all existing railcar side walls, all existing railcar end walls and all existing railcar top chord sections;
   forming an upper railcar body having top chord sections and a pair of end walls and side walls coupled to the top chord structure;
   forming an underframe construction including the cold formed center sill running the length of the car and bolsters configured to be above truck assemblies and coupled to the cold formed center sill; and
   coupling the upper body to the underframe, further including the step of cutting and splicing the cold formed center sill to a desired length prior to forming the underframe construction, wherein the step of cutting and splicing the cold formed center sill to a desired length prior to forming the underframe construction includes at least one of i) using a splice casting having a center section with the same profile as the exterior of the cold formed center sill with two end sections that telescope into the interior of spliced cold formed center sill sections or ii) using at least one cast transition casting between the cold formed center sill and a draft arm.

2. The method of modification of a railcar according to claim 1, wherein the existing railcar is a gondola railcar and the forming of the upper railcar body includes wherein each sidewall includes a side sheet a plurality of side stakes and side sill.

3. The method of modification of a railcar according to claim 2, wherein the forming of the underframe construction includes forming a plurality of lateral I-Beam cross bearers that extend from the center sill toward and stopping short of the inside of the side sheet, and wherein the cross bearers include vertical connection plates configured for coupling to side stakes which are positioned between the bolsters.

4. The method of modification of a railcar according to claim 1, wherein the splice casting as a total weight is less than 100 LBS.

5. The method of modification of a railcar according to claim 1, wherein each one of the at least one cast transition casting is less than 75 LBS.

6. The method of modification of a railcar according to claim 1, wherein the modified railcar after the step of coupling the upper body to the underframe is one of a gondola, open top hopper and covered hopper railcar type.

7. The method of modification of a railcar according to claim 1, wherein the modified railcar after the step of Coupling the upper body to the underframe is a car type defined as one of i) an open top, flat bottom gondola with a cold formed center sill, with no interior bracing, ii) an open top, all steel underframe with through cold formed center sill, outside stake, two piece composite side, with interior bracing, and twin rounded bottom tubs, iii) an open top three pocket hopper car, all steel underframe, stainless steel body, through cold formed center sill, iv) an open top, four longitudinal doors, hopper car, v) an open top, hopper, all steel underframe, three hopper pockets, and vi) an all steel underframe, through cold formed center sill, at least two bolt on hopper gates, curved roof, curved side construction, and loading hatches.

8. A method of modification of a railcar comprising the steps of:
   providing an existing railcar;
   removing an upper portion of the existing railcar including all existing railcar side walls, all existing railcar end walls and all existing railcar top chord sections;
   cutting and splicing a center sill of the existing railcar to a desired length to form a spliced center sill which includes using a splice casting having a center section with the same profile as the exterior of the center sill with two end sections that telescope into the interior of spliced center sill sections;
   forming an upper railcar body having top chord sections and a pair of end walls and side walls coupled to the top chord structure;
   forming an underframe construction including the spliced center sill running the length of the car and bolsters configured to be above truck assemblies and coupled to the center sill; and
   coupling the upper body to the underframe.

9. The method of modification of a railcar according to claim 8, wherein the splice casting has a total weight of less than 100 LBS.

10. The method of modification of a railcar according to claim 8, wherein at least one cast transition casting between the spliced center sill and a draft arm is used and wherein each cast transition casting has a total weight of less than 75 LBS.

11. The method of modification of a railcar according to claim 8 wherein the existing railcar includes a cold formed center sill.

12. The method of modification of a railcar according to claim 8, wherein the modified railcar after the step of coupling the upper body to the underframe is a car type defined as one of i) an open top, flat bottom gondola with a cold formed center sill, with no interior bracing, ii) an open top, all steel underframe with through cold formed center sill, outside stake, two piece composite side, with interior bracing, and twin rounded bottom tubs, iii) an open top three pocket hopper car, all steel underframe, stainless steel body, through cold formed center sill, iv) an open top, four longitudinal doors, hopper car, v) an open top, hopper, all steel underframe, three hopper pockets, and vi) an all steel underframe, through cold formed center sill, at least two bolt on hopper gates, curved roof, curved side construction, and loading hatches.

13. A method of modification of a gondola railcar comprising the steps of:
providing an existing double tub floor gondola railcar;
removing an upper portion of the existing railcar including any existing railcar side walls, any existing railcar end walls and any existing railcar top chord sections;
cutting and splicing a center sill of the existing railcar to a desired length to form a spliced center sill which includes using at least one of i) a splice casting having a center section with the same profile as the exterior of the center sill with two end sections that telescope into the interior of spliced center sill sections and ii) a cast transition casting between the spliced center sill and a draft arm;
forming an upper railcar body having top chord sections and a pair of end walls and side walls coupled to the top chord structure;
forming an underframe construction including the spliced center sill running the length of the car and bolsters configured to be above truck assemblies and coupled to the center sill; and
coupling the upper body to the underframe.

14. The method of modification of a railcar according to claim 13, wherein the modified railcar after the step of coupling the upper body to the underframe is a car type defined as one of i) an open top, flat bottom gondola with a cold formed center sill, with no interior bracing, ii) an open top, all steel underframe with through cold formed center sill, outside stake, two piece composite side, with interior bracing, and twin rounded bottom tubs, iii) an open top three pocket hopper car, all steel underframe, stainless steel body, through cold formed center sill, iv) an open top, four longitudinal doors, hopper car, v) an open top, hopper, all steel underframe, three hopper pockets, and vi) an all steel underframe, through cold formed center sill, at least two bolt on hopper gates, curved roof, curved side construction, and loading hatches.

15. The method of modification of a railcar according to claim 14, wherein a splice casting is used and the splice casting has a total weight of less than 100 LBS.

* * * * *